(12) United States Patent
Shibuya et al.

(10) Patent No.: US 9,604,101 B2
(45) Date of Patent: Mar. 28, 2017

(54) GOLF SWING ANALYSIS DEVICE AND GOLF SWING ANALYSIS METHOD

(71) Applicants: Seiko Epson Corporation, Tokyo (JP); Keio University, Tokyo (JP)

(72) Inventors: Kazuhiro Shibuya, Shiojiri (JP); Ken Ota, Fuchu (JP)

(73) Assignees: Seiko Epson Corporation (JP); Keio University (JP)

( * ) Notice: Subject to any disclaimer, the term of this patent is extended or adjusted under 35 U.S.C. 154(b) by 464 days.

(21) Appl. No.: 14/077,490

(22) Filed: Nov. 12, 2013

(65) Prior Publication Data

US 2014/0135139 A1 May 15, 2014

(30) Foreign Application Priority Data

Nov. 13, 2012 (JP) ................................ 2012-249224

(51) Int. Cl.
*A63B 21/00* (2006.01)
*A63B 23/16* (2006.01)
(Continued)

(52) U.S. Cl.
CPC ...... *A63B 24/0006* (2013.01); *A63B 69/3632* (2013.01); *G09B 19/0038* (2013.01)

(58) Field of Classification Search
CPC ............ G09B 19/0038; A63B 69/3632; A63B 24/0006; A63B 69/36; A63B 69/3623;
(Continued)

(56) References Cited

U.S. PATENT DOCUMENTS 5,688,183 A * 11/1997 Sabatino ............ A41D 19/0027
473/209
8,109,816 B1 * 2/2012 Grober ............... A63B 69/3632
463/3
(Continued)

FOREIGN PATENT DOCUMENTS

JP 11-169499 6/1999
JP 2004-024488 A 1/2004
(Continued)

OTHER PUBLICATIONS

Grober, "An Accelerometer Based Instrumentation of the Golf Club: Comparative Analysis of Golf Swings", Department of Applied Physics, Yale University, New Haven, CT (Dec. 30, 2009).
(Continued)

*Primary Examiner* — Lisa Caputo
*Assistant Examiner* — Brandi Hopkins
(74) *Attorney, Agent, or Firm* — Harness, Dickey & Pierce, P.L.C.

(57) ABSTRACT

A golf swing analysis device includes a joint force calculation section and a torque extraction section. The joint force calculation section generates a double pendulum model that includes a first link that corresponds to an upper part of a body of a golfer, a second link that corresponds to a golf club, and a joint that links the first link and the second link, and calculates a joint force applied to the joint along with a swing motion using an acceleration measured by an inertial sensor attached to the golf club. The torque extraction section extracts a torque that causes the second link to make a rotational motion around a first axis from the joint force.

12 Claims, 14 Drawing Sheets

(51) Int. Cl.
 *A63B 24/00* (2006.01)
 *G09B 19/00* (2006.01)
 *A63B 69/36* (2006.01)

(58) Field of Classification Search
 CPC ........ A63B 24/0021; A63B 2024/0009; A63B 2024/0028; A63B 2220/35; A63B 69/3658; A63B 2220/05; A63B 2220/40; A63B 71/0619; A63B 2071/0647; A63B 2220/51; A63B 2220/833; A63B 2220/836; A63B 2225/50; A63B 69/3611; A63B 24/0003; A63B 2220/34; A63B 53/08; A63B 2220/10; A63B 2024/0031; A63B 2024/0012; A63B 2220/806; G06T 2207/30196; G06T 7/2046; G06T 2207/10016; G06T 7/2033; G06T 2207/30204; G06T 2207/30241; G06T 2207/30221; G01N 3/20; G01N 3/22; G01P 15/04; G01P 3/00; G01B 21/22
 USPC ............ 473/221, 200; 700/91; 73/491, 379; 463/3
 See application file for complete search history.

(56) References Cited

U.S. PATENT DOCUMENTS

| | | | |
|---|---|---|---|
| 2002/0107085 A1* | 8/2002 | Lee | A63B 24/0003 473/221 |
| 2009/0005188 A1* | 1/2009 | Iwatsubo | A63B 24/0003 473/223 |
| 2009/0247312 A1 | 10/2009 | Sato et al. | |
| 2010/0210371 A1* | 8/2010 | Sato | A63B 59/0074 473/223 |
| 2010/0323805 A1 | 12/2010 | Kamino et al. | |
| 2012/0179418 A1 | 7/2012 | Takasugi et al. | |
| 2013/0005496 A1* | 1/2013 | Priester | A63B 24/0003 473/223 |
| 2013/0305806 A1* | 11/2013 | Saito | A63B 53/08 73/11.01 |

FOREIGN PATENT DOCUMENTS

| | | |
|---|---|---|
| JP | 2008-073210 A | 4/2008 |
| JP | 2009-125507 A | 6/2009 |
| JP | 2009-240677 A | 10/2009 |
| JP | 2010-011926 A | 1/2010 |

OTHER PUBLICATIONS

K. Ohta et al., "Mathematical Analysis of Golf Swing Based on a Double Pendulum With Moving Pivot", Proceedings of the Symposium on Sports and Human Dynamics 2011, Oct. 30, 2011, Japan, The Japan Society of Mechanical Engineers, pp. 447-452 with English translation.

\* cited by examiner

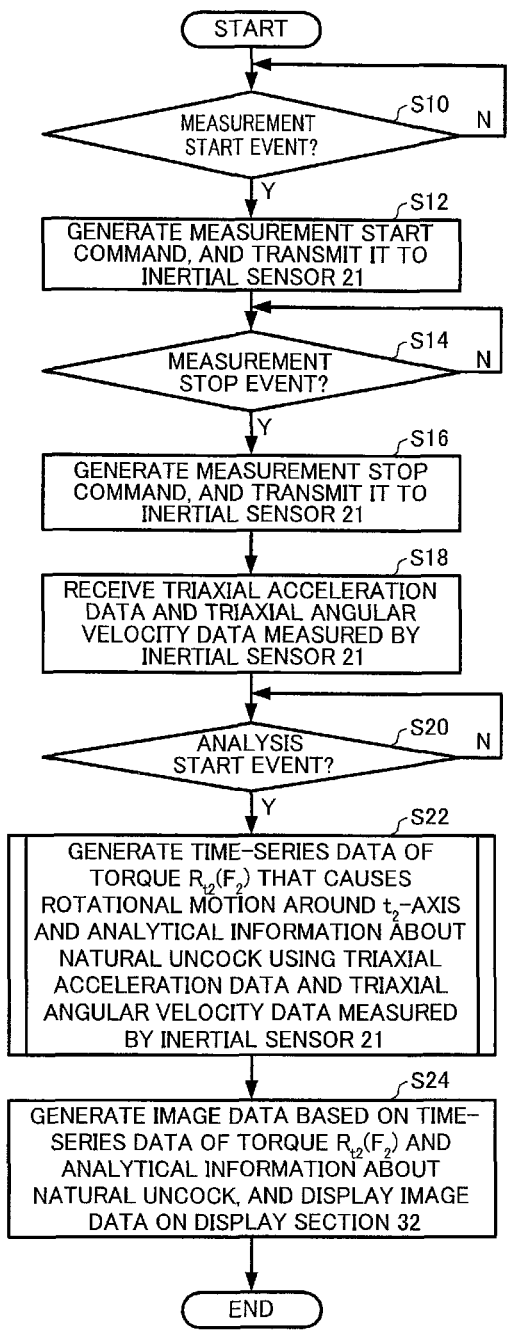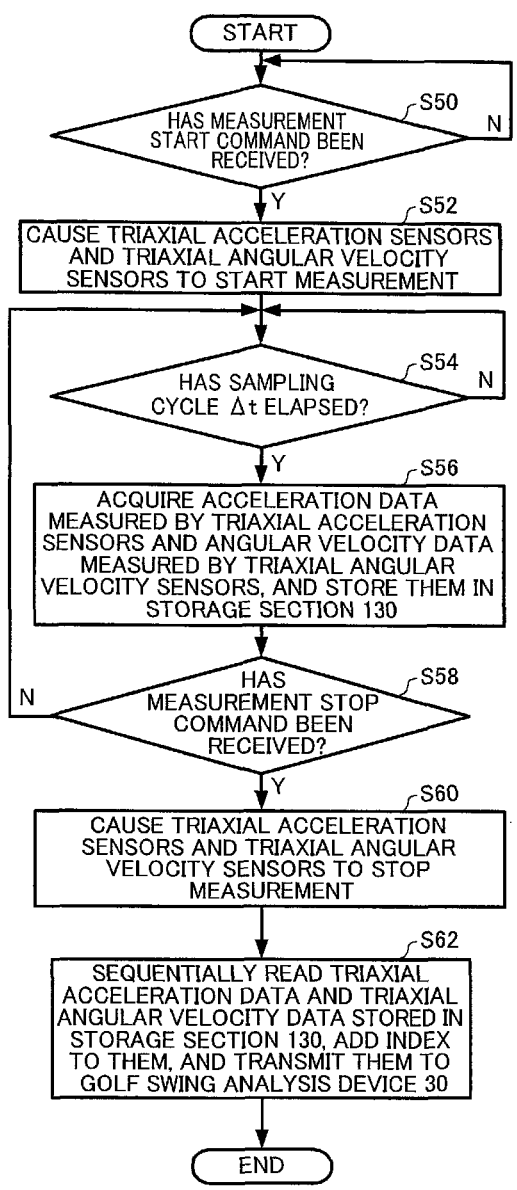

GOLF SWING ANALYSIS DEVICE AND GOLF SWING ANALYSIS METHOD

Japanese Patent Application No. 2012-249224 filed on Nov. 13, 2012 is hereby incorporated by reference in its entirety.

BACKGROUND OF THE INVENTION

The present invention relates to a golf swing analysis device and a golf swing analysis method.

A golf swing analysis device such as that disclosed in JP-A-2010-11926 has been known. The golf swing analysis device disclosed in JP-A-2010-11926 utilizes an optical motion capture system that captures the state of a swing made by a golfer. A marker is fixed at a given position of the golfer or golf club, and the moving path of the given position is recorded by capturing the motion of the marker.

However, a golf swing analysis device that utilizes an optical motion capture system, such as that disclosed in JP-A-2010-11926, has a problem in that large equipment is required, and field measurement is difficult. In recent years, a golf swing analysis method that utilizes an inertial sensor has been used in order to solve the above problem. For example, the golf swing analysis device disclosed in JP-A-11-169499 is designed so that an acceleration sensor is attached to a golf club, and a golf swing is analyzed utilizing the acceleration measured by the acceleration sensor.

A related-art golf swing analysis device that utilizes an inertial sensor makes it possible to analyze a golf swing, but has a problem in that it is impossible to provide information that makes it possible to analyze a timing at which a transition to a natural swing occurs (i.e., a timing at which the golfer reduces the rotation of the shoulders to some extent during a swing) after the power produced by the upper part of the body of the golfer has been transmitted to the golf club in the first half of the swing (and a phenomenon that causes such a situation).

SUMMARY

Several aspects of the invention may provide a golf swing analysis device and a golf swing analysis method that can provide information that makes it possible to analyze a natural swing.

According to a first aspect of the invention, there is provided a golf swing analysis device including:

a joint force calculation section that generates a double pendulum model that includes a first link that corresponds to an upper part of a body of a golfer, a second link that corresponds to a golf club, and a joint that links the first link and the second link, and calculates a joint force applied to the joint along with a swing motion using an acceleration measured by a first inertial sensor attached to the golf club; and a torque extraction section that extracts a torque that causes the second link to make a rotational motion around a first axis from the joint force.

According to a second aspect of the invention, there is provided a golf swing analysis device including:

a joint force calculation section that generates a double pendulum model that includes a first link that corresponds to an upper part of a body of a golfer, a second link that corresponds to a golf club, and a joint that links the first link and the second link, and calculates at least one component among a plurality of components obtained by decomposing a joint force applied to the joint along with a swing motion using at least one of an angular velocity measured by a first inertial sensor attached to the golf club, an acceleration measured by a second inertial sensor attached to the upper part of the body of the golfer, and an angular velocity measured by the second inertial sensor; and a torque extraction section that extracts a torque that causes the second link to make a rotational motion around a first axis from each component of the joint force calculated by the joint force calculation section.

According to a third aspect of the invention, there is provided a golf swing analysis method including:

a joint force calculation step that generates a double pendulum model that includes a first link that corresponds to an upper part of a body of a golfer, a second link that corresponds to a golf club, and a joint that links the first link and the second link, and calculates a joint force applied to the joint along with a swing motion using an acceleration measured by a first inertial sensor attached to the golf club; and a torque extraction step that extracts a torque that causes the second link to make a rotational motion around a first axis from the joint force.

BRIEF DESCRIPTION OF THE SEVERAL VIEWS OF THE DRAWING

FIG. 7A is a flowchart illustrating an example of a process performed by the golf swing analysis device according to the first embodiment, and FIG. 7B is a flowchart illustrating an example of a process performed by an inertial sensor.

DETAILED DESCRIPTION OF THE EMBODIMENT

Figure 1:
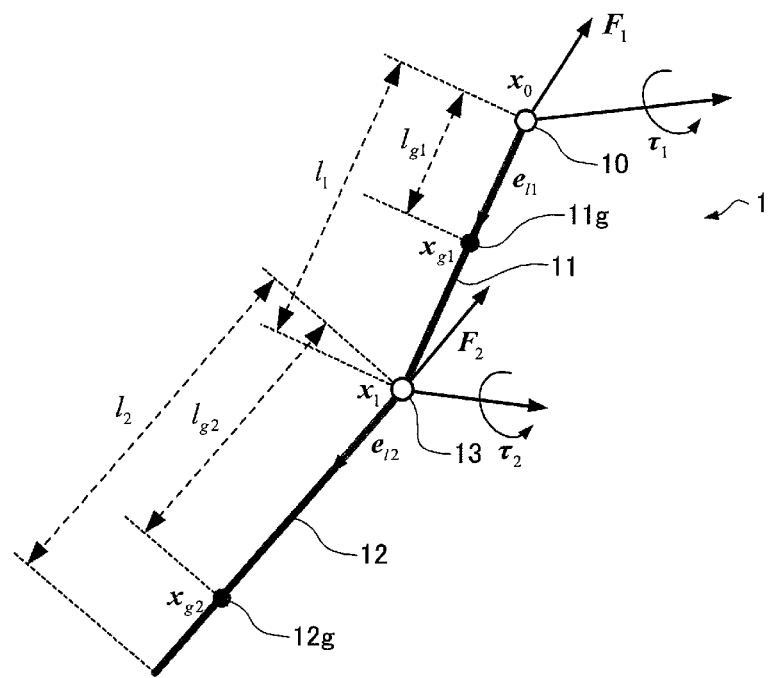
FIG. 1 is a view illustrating a double pendulum model.

The invention was conceived in order to solve at least some of the above problems, and may be implemented by the following aspects or application examples.

Application Example 1

A golf swing analysis device according to Application Example 1 includes a joint force calculation section that generates a double pendulum model that includes a first link that corresponds to an upper part of a body of a golfer, a second link that corresponds to a golf club, and a joint that links the first link and the second link, and calculates a joint force applied to the joint along with a swing motion using an acceleration measured by a first inertial sensor attached to the golf club, and a torque extraction section that extracts a torque that causes the second link to make a rotational motion around a first axis from the joint force.

The first inertial sensor may include triaxial acceleration sensors and triaxial angular velocity sensors, for example.

Since the golf swing analysis device according to Application Example 1 can provide information about the torque that contributes to a rotational motion around a given axis around the joint, the golfer can analyze the natural swing using the information.

Application Example 2

In the golf swing analysis device, the first axis may be an axis that is orthogonal to a longitudinal axis of the second link that corresponds to the golf club.

Since the golf swing analysis device according to Application Example 2 can provide information about the torque that contributes to a rotational motion in a plane including the second link around the joint, the golfer can analyze the natural swing using the information.

Application Example 3

In the golf swing analysis device, the first axis may be an axis that is orthogonal to the longitudinal axis of the second link that corresponds to the golf club and a travel direction of the second link.

For example, the torque extraction section may specify the travel direction of the second link using the angular velocity measured by the first inertial sensor and the longitudinal axis direction of the second link that corresponds to the golf club.

Since the golf swing analysis device according to Application Example 3 can provide information about the torque that contributes to a rotational motion around the joint for which the travel direction of the second link is a tangent, the golfer can analyze the timing at which a natural swing occurs using the information.

Application Example 4

The golf swing analysis device may further include a torque change detection section that detects a timing at which a sign of the torque detected by the torque extraction section changes.

According to the golf swing analysis device, the golfer can easily estimate the natural swing start timing from the information about the timing at which the direction of the torque changes.

Application Example 5

In the golf swing analysis device, the joint force calculation section may calculate at least one component among a plurality of components obtained by decomposing the joint force using at least one of an angular velocity measured by the first inertial sensor, an acceleration measured by a second inertial sensor attached to the upper part of the body of the golfer, and an angular velocity measured by the second inertial sensor, and the torque extraction section may extract a torque component that causes the second link to make a rotational motion around the first axis from each of the plurality of components of the joint force calculated by the joint force calculation section.

The second inertial sensor may include triaxial acceleration sensors and triaxial angular velocity sensors, for example.

Since the golf swing analysis device according to Application Example 5 can provide information about a plurality of torque components that contribute to a rotational motion of the second link around a given axis around the joint, the golfer can analyze the natural swing in detail using the information.

Application Example 6

In the golf swing analysis device, the joint force calculation section may calculate a component of the joint force in a travel direction of the second link using an angular velocity measured by the first inertial sensor, and calculating a component of the joint force in a longitudinal axis direction of the first link using an angular velocity measured by a second inertial sensor attached to the upper part of the body of the golfer, and the torque extraction section may extract a torque component that causes the second link to make a rotational motion around the first axis from each of the component in the travel direction of the second link and the component in the longitudinal axis direction of the first link calculated by the joint force calculation section.

Since the golf swing analysis device according to Application Example 6 can provide information about two torque components that contribute to a rotational motion of the second link around a given axis around the joint, the golfer can efficiently analyze the natural swing in detail using the information.

Application Example 7

The golf swing analysis device may further include an analytical information generation section that generates analytical information about a natural swing using the timing detected by the torque change detection section at which the sign of the torque changes, or the torque component extracted by the torque extraction section.

The golf swing analysis device according to Application Example 7 can reduce the burden imposed on the golfer due to natural swing analysis.

Application Example 8

In the golf swing analysis device, the first link may correspond to a virtual line that connects a center point of a line that connects the shoulders of the golfer and a grip of the golf club.

The golf swing analysis device according to Application Example 8 can generate a double pendulum model appropriate for golf swing analysis, and provide information for more accurate swing analysis.

Application Example 9

A golf swing analysis device according to Application Example 9 includes a joint force calculation section that generates a double pendulum model that includes a first link that corresponds to an upper part of a body of a golfer, a second link that corresponds to a golf club, and a joint that links the first link and the second link, and calculates at least one component among a plurality of components obtained by decomposing a joint force applied to the joint along with a swing motion using at least one of an angular velocity measured by a first inertial sensor attached to the golf club, an acceleration measured by a second inertial sensor attached to the upper part of the body of the golfer, and an angular velocity measured by the second inertial sensor, and a torque extraction section that extracts a torque that causes the second link to make a rotational motion around a first axis from each component of the joint force calculated by the joint force calculation section.

Since the golf swing analysis device according to Application Example 9 can provide information about a plurality of torque components that contribute to a rotational motion of the second link around a given axis around the joint, the golfer can analyze the natural swing in detail.

Application Example 10

A golf swing analysis system according to Application Example 10 includes a first inertial sensor attached to a golf club, and a golf swing analysis device, the golf swing analysis device including a joint force calculation section that generates a double pendulum model that includes a first link that corresponds to an upper part of a body of a golfer, a second link that corresponds to a golf club, and a joint that links the first link and the second link, and calculates a joint force applied to the joint along with a swing motion using an acceleration measured by the first inertial sensor, and a torque extraction section that extracts a torque that causes the second link to make a rotational motion around a first axis from the joint force.

Application Example 11

A golf swing analysis program according to Application Example 11 causes a computer to function as a joint force calculation section that generates a double pendulum model that includes a first link that corresponds to an upper part of a body of a golfer, a second link that corresponds to a golf club, and a joint that links the first link and the second link, and calculates a joint force applied to the joint along with a swing motion using an acceleration measured by a first inertial sensor attached to the golf club, and a torque extraction section that extracts a torque that causes the second link to make a rotational motion around a first axis from the joint force.

Application Example 12

A computer-readable recording medium according to Application Example 12 stores the golf swing analysis program.

Application Example 13

A golf swing analysis method according to Application Example 13 includes a joint force calculation step that generates a double pendulum model that includes a first link that corresponds to an upper part of a body of a golfer, a second link that corresponds to a golf club, and a joint that links the first link and the second link, and calculates a joint force applied to the joint along with a swing motion using an acceleration measured by a first inertial sensor attached to the golf club, and a torque extraction step that extracts a torque that causes the second link to make a rotational motion around a first axis from the joint force.

Exemplary embodiments of the invention are described in detail below with reference to the drawings. Note that the following exemplary embodiments do not unduly limit the scope of the invention as stated in the claims. Note also that all of the elements described below in connection with the exemplary embodiments should not necessarily be taken as essential elements of the invention.

1. Force Level Natural Rotation Analytical Theory

In order to analyze the motion of a golf swing, the upper part of the body of a golfer and a golf club are modeled using a double pendulum model that makes a three-dimensional motion. FIG. 1 is a view illustrating the structure of the double pendulum model. As illustrated in FIG. 1, a double pendulum model 1 includes a fulcrum 10, a first link 11, a second link 12, and a joint 13, and makes a free motion in a three-dimensional space. The fulcrum 10 corresponds to the center point of a line that connects the right and left shoulders, and has three degrees of positional freedom and three degrees of rotational freedom (six degrees of freedom in total). The joint 13 is a node that links the first link 11 and the second link 12. The joint 13 corresponds to the grip of the golf club, and has three degrees of rotational freedom. The first link 11 is a link that corresponds to a virtual line that connects the fulcrum 10 and the joint 13. The first link 11 corresponds to the right and left upper arms and forearms that are considered to be one rigid body. The second link 12 is a link connected to the joint 13 opposite to the first link 11, and corresponds to the golf club.

In the double pendulum model 1, $x_0$ is the position vector of the fulcrum 10, and $x_1$ is the position vector of the joint 13. $x_{g1}$ is the position vector of the center of gravity 11g of the first link 11, and $x_{g2}$ is the position vector of the center of gravity 12g of the second link 12. $m_1$ is the mass of the first link 11, $l_1$ is the length of the first link 11, $m_2$ is the mass of the second link 12, and $l_2$ is the length of the second link 12. $l_{g1}$ is the distance between the fulcrum 10 and the center of gravity 11g of the first link 11, and $l_{g2}$ is the distance between the joint 13 and the center of gravity 12g of the second link 12. $e_{l1}$ is the unit vector in the longitudinal axis direction of the first link 11. The position vector $x_{g1}$ of the center of gravity 11g of the first link 11 is given by the following expression (1). The position vector $x_1$ of the joint 13 is given by the following expression (2). $e_{l2}$ is the unit vector in the longitudinal axis direction of the second link 12. The position vector $x_{g2}$ of the center of gravity 12g of the second link 12 is given by the following expression (3).

$$x_{g1} = x_0 + l_{g1} e_{l1} \tag{1}$$

$$x_1 = x_0 + l_1 e_{l1} \tag{2}$$

$$x_{g2} = x_0 + l_1 e_{l1} + l_{g2} e_{l2} \tag{3}$$

The acceleration vectors of the position vectors $x_{g1}$, $x_1$, and $x_{g2}$ are obtained by second order differentiation of the expressions (1) to (3) (see the following expressions (4) to (6)), and the following expression (7) is obtained by substituting the expression (5) in the expression (6). In the expressions (4) to (6), omega$_1$ is the angular velocity vector of the fulcrum 10, and omega$_2$ is the angular velocity vector of the joint 13.

$$\ddot{x}_{g1} = \ddot{x}_0 + \dot{\omega}_1 \times l_{g1} e_{l1} + \omega_1 \times (\omega_1 \times l_{g1} e_{l1}) \quad (4)$$

$$\ddot{x}_1 = \ddot{x}_0 + \dot{\omega}_1 \times l_{g1} e_{l1} + \omega_1 \times (\omega_1 \times l_1 e_{l1}) \quad (5)$$

$$\ddot{x}_{g2} = \ddot{x}_1 + \dot{\omega}_2 \times l_{g2} e_{l2} + \omega_2 \times (\omega_2 \times l_{g2} e_{l2}) \quad (6)$$

$$\ddot{x}_{g2} = \ddot{x}_0 + \dot{\omega}_1 \times l_1 e_{l1} + \omega_1 \times (\omega_1 \times l_1 e_{l1}) + \dot{\omega}_2 \times l_{g2} e_{l2} + \omega_2 \times (\omega_2 \times l_{g2} e_{l2}) \quad (7)$$

The first link 11 and the second link 12 make a translational motion and a rotational motion. F$_1$ is the force vector that indicates the joint force (external force in the double pendulum model 1) that is applied to the fulcrum 10, and F$_2$ is the force vector that indicates the joint force (internal force in the double pendulum model 1) that is applied to the joint 13. The translational dynamics of the first link 11 and the translational dynamics of the second link 12 are respectively given by the following expressions (8) and (9). In the expressions (8) and (9), g is the gravitational acceleration vector.

$$m_1(\ddot{x}_{g1} - g) = F_1 - F_2 \quad (8)$$

$$m_2(\ddot{x}_{g2} - g) = F_2 \quad (9)$$

tau$_1$ is the torque vector that is applied to the fulcrum 10 and rotates the first link 11, and tau$_2$ is the torque vector that is applied to the joint 13 and rotates the second link 12. The rotational dynamics of the first link 11 and the rotational dynamics of the second link 12 are respectively given by the following expressions (10) and (11). In the expressions (10) and (11), J$_1$ is the inertia tensor of the first link 11, and J$_2$ is the inertia tensor of the second link 12.

$$J_1 \dot{\omega}_1 + \omega_1 \times J_1 \omega_1 = \tau_1 - \tau_2 - l_{g1} e_{l1} \times F_1 + (l_1 - l_{g1}) e_{l1} \times (-F_2) \quad (10)$$

$$J_2 \dot{\omega}_2 + \omega_2 \times J_2 \omega_2 = \tau_2 - l_{g2} e_{l2} \times F_2 \quad (11)$$

Figure 2:
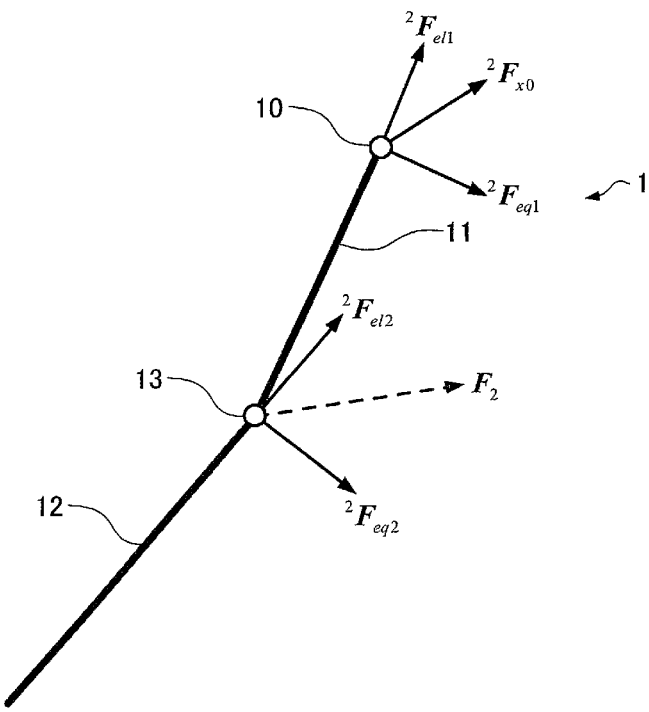
FIG. 2 is a view illustrating a joint force applied to the joint of a double pendulum model.

The force vector F$_2$ is given by the following expression (12) by substituting the expression (7) in the expression (9). The expression (12) indicates that the force vector F$_2$ includes five components based on the motions of the first link 11 and the second link 12. As illustrated in FIG. 2, the first component $^2F_{x0}$ is a component based on the translational motion of the fulcrum 10 (i.e., the center point between the shoulders), the second component $^2F_{eq1}$ is a component based on the angular acceleration of the first link 11 (right and left upper arms and forearms), the third component $^2F_{el1}$ is a component based on the centripetal acceleration of the first link 11 (right and left upper arms and forearms), the fourth component $^2F_{eq2}$ is a component based on the angular acceleration of the second link 12 (golf club), and the fifth component $^2F_{el2}$ is a component based on the centripetal acceleration of the second link 12 (golf club). The direction of the third component $^2F_{el1}$ coincides with the negative direction of the unit vector $e_{l1}$, and the direction of the fifth component $^2F_{el2}$ coincides with the negative direction of the unit vector $e_{l2}$. The second component $^2F_{eq1}$ is orthogonal to the unit vector $e_{l1}$, and the fourth component $^2F_{eq2}$ is orthogonal to the unit vector $e_{l2}$. The rotational motion of the head of the golf club occurs in the direction opposite to the direction of the vector $^2F_{eq2}$ that is applied to the joint 13 (grip).

$$F_2 = \underbrace{m_2(\ddot{x}_0 - g)}_{^2F_{x0}} + \underbrace{m_2(\dot{\omega}_1 \times l_1 e_{l1})}_{^2F_{eq1}} + \underbrace{m_2(\omega_1 \times (\omega_1 \times l_1 e_{l1}))}_{^2F_{el1}} + \underbrace{m_2(\dot{\omega}_2 \times l_{g2} e_{l2})}_{^2F_{eq2}} + \underbrace{m_2(\omega_2 \times (\omega_2 \times l_{g2} e_{l2}))}_{^2F_{el2}} \quad (12)$$

In the double pendulum model 1, the force vector F$_2$ is an internal force, and is not explicitly expressed by a motion equation that uses generalized coordinates (e.g., Lagrange's motion equation). The effects of the motion of the link can be expressed (see the expression (12)) using multibody dynamics analysis.

The contribution of each component of the force vector F$_2$ to the rotation of the golf club is analyzed below using the force level (torque level). Since rotation around the axis of the shaft of the golf club (rotation around the longitudinal axis of the second link 12) occurs during the swing motion of the golf club, the travel direction (speed direction) of the golf club does not coincide with the coordinate axis fixed to the golf club. Therefore, an analysis club coordinate system sigma$_{q2}$ is defined. Specifically, the unit vector $e_{q2}$ of the speed ($de_{l2}/dt$) of the unit vector $e_{l2}$ fixed in the shaft axis direction of the golf club is defined (see the following expression (13)). The unit vector $e_{q2}$ has a direction that coincides with the tangential direction of the rotational motion of the second link 12 around the joint 13, and is vertical to the unit vector $e_{l2}$. The unit vector $e_{t2}$ that has a direction vertical to the unit vector $e_{l2}$ and the unit vector $e_{q2}$ is also defined (see the following expression (14)).

$$e_{q2} \equiv \frac{de_{l2}}{dt} \Big/ \left|\frac{de_{l2}}{dt}\right| \quad (13)$$

$$e_{t2} \equiv e_{l2} \times e_{q2} \quad (14)$$

Figure 3:
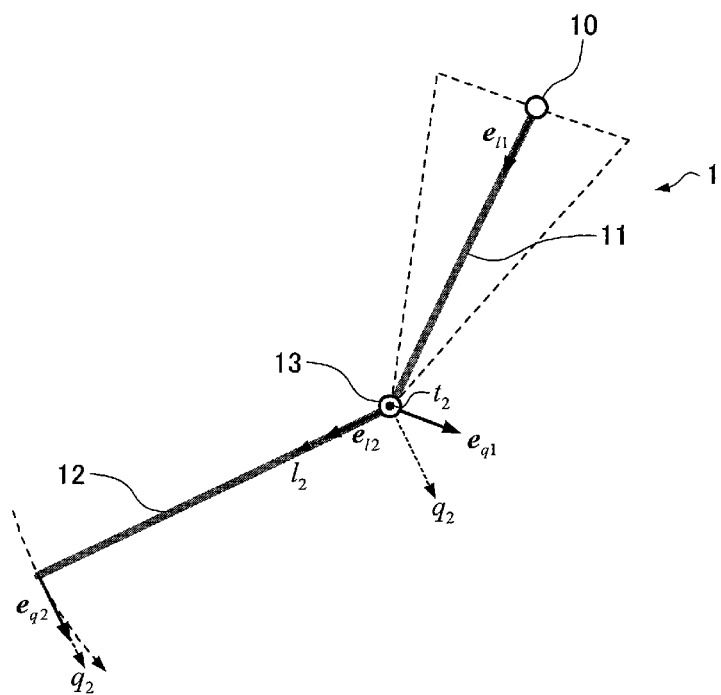
FIG. 3 is a view illustrating the relationship between a double pendulum model and a analysis club coordinate system.

The directions of the unit vectors $e_{q2}$, $e_{t2}$, and $e_{l2}$ are set to be the axes ($q_2$, $t_2$, $l_2$) of the coordinate system sigma$_{q2}$. FIG. 3 is a view illustrating the relationship between the double pendulum model 1 and the coordinate system sigma$_{q2}$. As illustrated in FIG. 3, when a swing has occurred counterclockwise relative to the sheet, the coordinate axis $q_2$ and the coordinate axis $l_2$ are orthogonal to each other, and the coordinate axis $t_2$ is orthogonal to the sheet, the positive direction of the coordinate axis $t_2$ being the forward direction relative to the sheet.

The operator $R_{t2}(\bullet)$ with respect to the force vector X is then defined (see the following expression (15)). The operator $R_{t2}(\bullet)$ returns only the $t_2$-axis component (i.e., a component in the direction vertical to the swing plane of the golf club) of the torque vector ($-l_{g2}e_{l2} \times X$) that causes rotation of the golf club (second link 12) with respect to the force vector X. Therefore, the rotational force that contributes to the swing of the golf club (i.e., the rotational motion of the second link 12) can be extracted from the force vector X by applying the operator $R_{t2}(\bullet)$ to the force vector X. The following expression (16) is obtained by applying the operator $R_{t2}(\bullet)$ to the force vector F$_2$ applied to the joint 13 taking account of the expression (12).

$$R_{t2}(X) \equiv e_{t2}{}^\tau (-l_{g2} e_{l2} \times X) \quad (15)$$

$$R_{t2}(F_2) = R_{t2}(^2F_{x0}) + R_{t2}(^2F_{eq1}) + R_{t2}(^2F_{el1}) + R_{t2}(^2F_{eq2}) + R_{t2}(^2F_{el2}) \quad (16)$$

Since the fifth component $^2F_{el2}$ of the joint force F$_2$ (force vector) is applied in the $l_2$-axis direction, the fifth component $^2F_{el2}$ does not contribute to the rotational motion of the second link 12 (golf club). Specifically, $R_{t2}(^2F_{el2})=0$. Since a rotational motion around each shoulder is performed during a golf swing without moving the center between the shoulders to a large extent, the contribution of the first component $^2F_{x0}$ can be disregarded. Specifically, the rotational force $R_{t2}(^2F_{el2})$ is approximately equal to 0. Since the contribution of the second component $^2F_{eq1}$ is small when the torque $tau_2$ is applied to the joint 13 (grip), the rotational force $R_{t2}(^2F_{eq1})$ is close to 0. Therefore, the rotational motion of the golf club is determined by the rotational force $R_{t2}(^2F_{el1})$ derived from the third component $^2F_{el1}$ and the rotational force $R_{t2}(^2F_{eq2})$ derived from the fourth component $^2F_{eq2}$.

Since the direction of the rotational force $R_{t2}(^2F_{el1})$ is opposite to the direction of the rotational force $R_{t2}(^2F_{eq2})$ taking account of the angle formed by the first link 11 (right and left upper arms and forearms) and the second link 12 (golf club) during a swing, the rotation direction of the second link 12 (golf club) changes depending on the balance between the rotational forces.

Since the centripetal force that mediates the energy transfer from the first link 11 (right and left upper arms and forearms) to the second link 12 (golf club) is proportional to the second power of the angular velocity, it takes time to increase the centripetal force in terms of integration, and a delay in change in speed occurs between the first link 11 and the second link 12 during a whip motion. Therefore, the rotational force $R_{t2}(^2F_{eq2})$ derived from the fourth component $^2F^{eq2}$ is normally large in the first half of the swing motion, and the rotational force $R_{t2}(^2F_{el1})$ derived from the third component $^2F_{el1}$ increases in the second half of the swing motion. As a result, a force that pulls the second link 12 (golf club) in the direction opposite to the swing rotation direction is applied in the first half of the swing motion due to the rotational force $R_{t2}(^2F_{eq2})$, and a force that pulls the second link 12 (golf club) in the direction in which the first link 11 and the second link 12 gradually become straight (in the swing rotation direction) is applied in the second half of the swing motion due to the rotational force $R_{t2}(^2F_{el1})$. The above balance changes in the middle of the swing.

Therefore, the following expression (17) is obtained as a condition whereby the club naturally starts to rotate independently of the torque $tau_2$ of the joint 13 (grip). A phenomenon in which the condition expressed by the expression (17) is satisfied, and the golf club naturally starts rotation is hereinafter referred to as "(force level) natural uncock". Specifically, the term "natural uncock" refers to a situation in which the golf club naturally uncocks due to only the pendulum-like nature (or the mechanical nature) of the first link 11 and the second link 12 even when the golfer does not utilize a muscular force. It is considered that the natural uncock timing and the quality (carry and stability) of the ball hit have a causal relationship.

$$R_{t2}(F_2)>0 \quad (17)$$

It is known that a double pendulum motion is normally chaotic in a typical non-linear system. However, when the golfer controls a swing motion, such a chaotic motion does not occur since the torque $tau_2$ of the wrist is applied to stop the rotation of the golf club in the direction opposite to the rotation direction of the arm at the grip. The above force particularly contributes to prevention of chaotic motion in the first half of the swing. In other words, the motion of the golf club becomes unstable in the first half of the swing when the torque $tau_2$ is not applied. Specifically, it is considered that the torque $tau_2$ makes a contribution in the first half of the swing in order to mainly prevent an unstable state in which the head of the golf club is returned in the direction opposite to the swing direction. The torque $tau_2$ may also function to prevent a situation in which it is difficult to control the golf club at the time of impact due to an increase in the relative angle of the golf club and the arm at the time of natural uncock.

2. Golf Swing Analysis System

2-1. First Embodiment

Outline of Golf Swing Analysis System

Since it is considered that the natural uncock timing and the quality (carry and stability) of the ball hit have a causal relationship (see above), a golf swing can be analyzed based on the natural uncock timing. A golf swing analysis system according to a first embodiment provides information that makes it possible to analyze the natural uncock timing during a golf swing.

Figure 4:
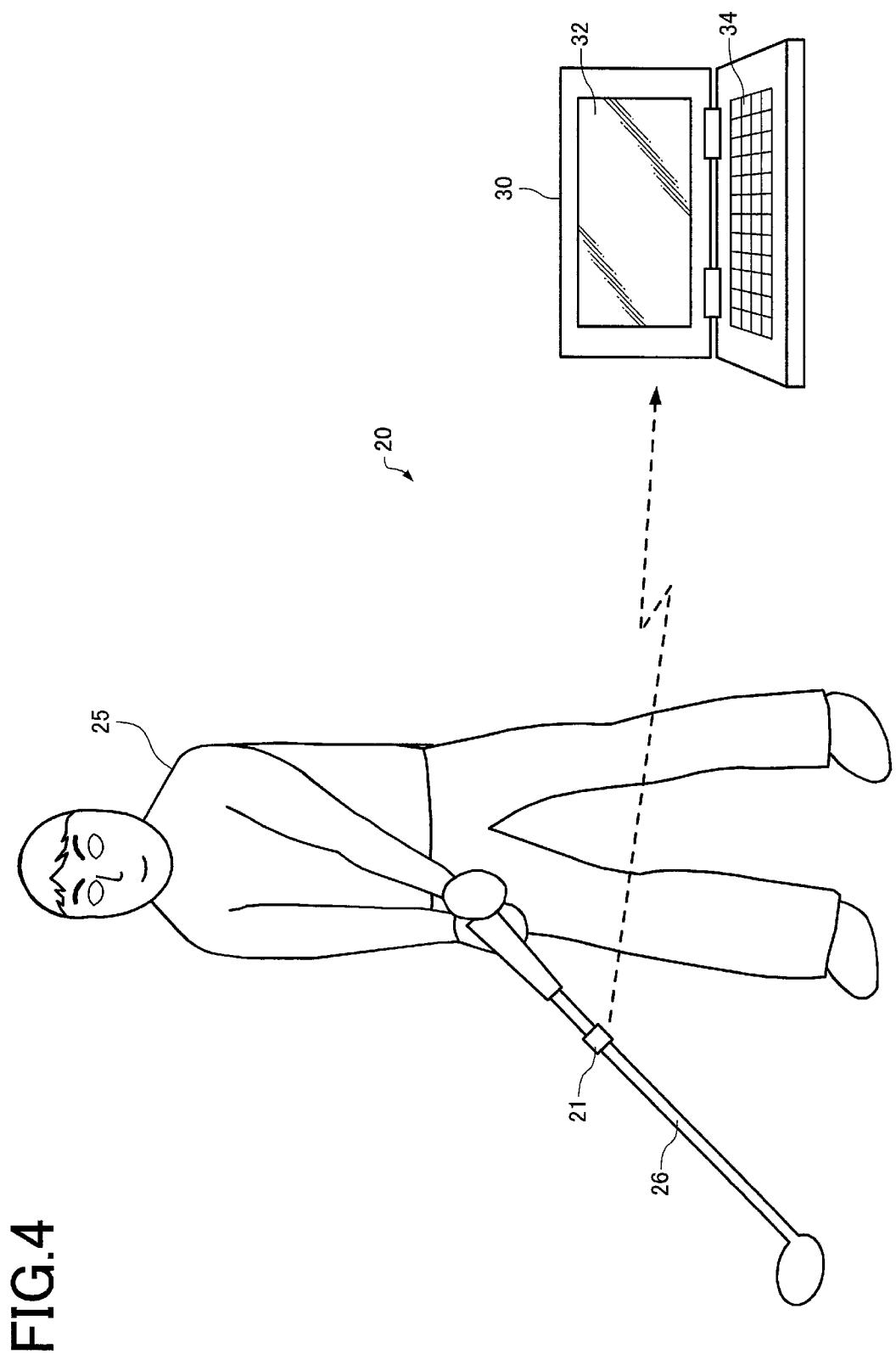
FIG. 4 is a view illustrating an outline of a golf swing analysis system according to a first embodiment.

FIG. 4 is a view illustrating an outline of the golf swing analysis system according to the first embodiment. As illustrated in FIG. 4, a golf swing analysis system 20 according to the first embodiment includes an inertial sensor 21 (first inertial sensor) and a golf swing analysis device 30.

The inertial sensor 21 can measure triaxial accelerations and triaxial angular velocities, and is attached at a position at which the motion of a golf club 26 held by a golfer 25 can be measured. The inertial sensor 21 may be attached to the shaft of the golf club 26, for example. When using the golf swing analysis system according to the first embodiment, the golfer 25 makes a swing while holding the golf club 26 after the inertial sensor 21 has started measurement. The inertial sensor 21 measures the triaxial accelerations and the triaxial angular velocities during a period including the start and the end of the swing, and transmits the measured triaxial acceleration data and triaxial angular velocity data to the golf swing analysis device 30. The data communication between the inertial sensor 21 and the golf swing analysis device 30 may be implemented by wireless communication, or may be implemented by cable communication.

The golf swing analysis device 30 receives the triaxial acceleration data and the triaxial angular velocity data measured by the inertial sensor 21, generates information that makes it possible to analyze the natural uncock timing, and displays the information on a display section 32. The user (may be the golfer 25) operates an operation section 34 of the golf swing analysis device 30 to switch the display information or implement a calculation process corresponding to the object of analysis.

Configuration of Inertial Sensor

Figure 5:
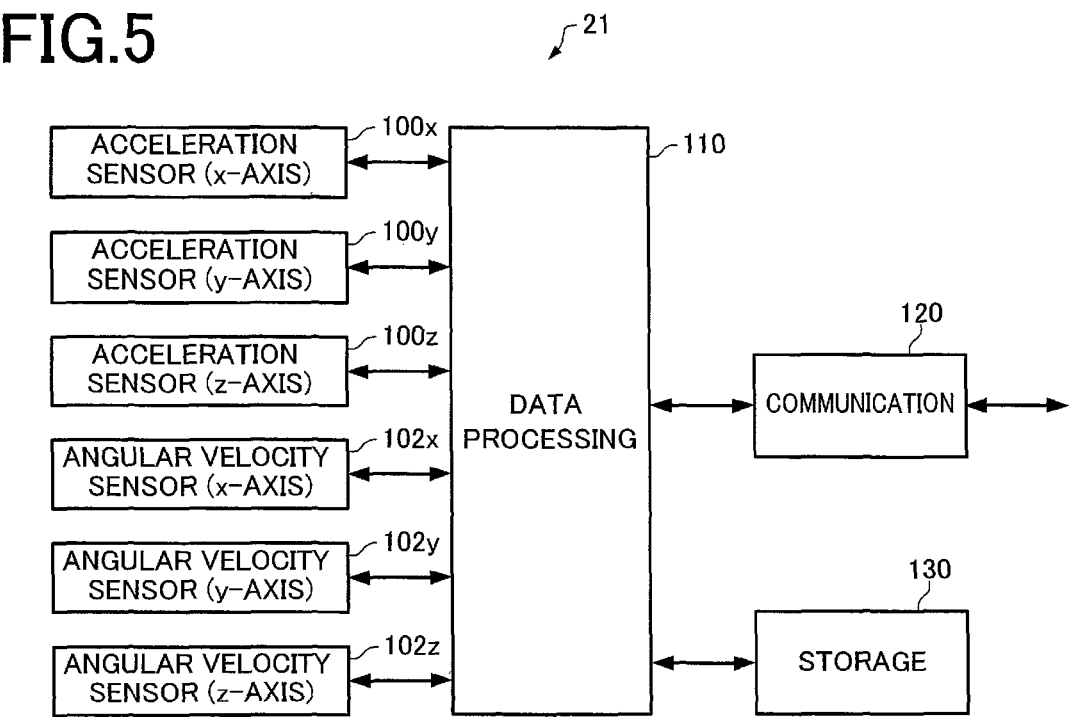
FIG. 5 is a view illustrating a configuration example of an inertial sensor.

FIG. 5 is a view illustrating a configuration example of the inertial sensor 21. As illustrated in FIG. 5, the inertial sensor 21 includes triaxial (x-axis, y-axis, and z-axis) acceleration sensors (acceleration sensors $100x$, $100y$, and $100z$), triaxial (x-axis, y-axis, and z-axis) angular velocity sensors (angular velocity sensors $102x$, $102y$, and $102z$), a data processing section 110, a communication section 120, and a storage section 130.

The acceleration sensors $100x$, $100y$, and $100z$ respectively measure the acceleration in the x-axis direction, the acceleration in the y-axis direction, and the acceleration in the z-axis direction, and output the measured acceleration data, the x-axis direction, the y-axis direction, and the z-axis direction being orthogonal to each other. The angular velocity sensors $102x$, $102y$, and $102z$ respectively measure the angular velocity around the x-axis, the angular velocity around the y-axis, and the angular velocity around the z-axis, and output the measured angular velocity data. A sensor coordinate system $sigma_{S2}$ is defined by the x-axis, the y-axis, and the z-axis. In the first embodiment, the inertial sensor 21 is attached so that the y-axis extends along the longitudinal axis direction of the shaft of the golf club 26, and the x-axis and the z-axis are vertical to the longitudinal axis direction of the shaft.

The data processing section 110 causes the acceleration sensors 100x, 100y, and 100z and the angular velocity sensors 102x, 102y, and 102z to start measurement when the data processing section 110 has received a measurement start command from the communication section 120, simultaneously or sequentially samples the data output from each sensor in a given cycle deltat, and sequentially stores the sampled data in the storage section 130. The data processing section 110 causes the acceleration sensors 100x, 100y, and 100z and the angular velocity sensors 102x, 102y, and 102z to stop measurement when the data processing section 110 has received a measurement stop command from the communication section 120, sequentially reads the triaxial acceleration data and the triaxial angular velocity data stored in the storage section 130, adds identical index information to the data measured at the same time, and transmits the triaxial acceleration data and the triaxial angular velocity data to the communication section 120. Note that the data processing section 110 may transmit some or all of the triaxial acceleration data and the triaxial angular velocity data to the communication section 120 in real time when the data processing section 110 has received the measurement start command from the communication section 120. The data processing section 110 may perform a bias correction process and a temperature correction process on the acceleration sensors 100x, 100y, and 100z and the angular velocity sensors 102x, 102y, and 102z. A bias correction function and a temperature correction function may be incorporated in the acceleration sensors 100x, 100y, and 100z and the angular velocity sensors 102x, 102y, and 102z.

The communication section 120 performs a process that receives the measurement start command or the measurement stop command from the golf swing analysis device 30, and transmits the measurement start command or the measurement stop command to the data processing section 110, a process that sequentially receives the triaxial acceleration data and the triaxial angular velocity data provided with the index information from the data processing section 110, and transmits the triaxial acceleration data and the triaxial angular velocity data to the golf swing analysis device 30, and the like. A three-dimensional acceleration vector $a_{S2}$ is defined by the triaxial acceleration data to which an identical index is added, and a three-dimensional angular velocity vector $omega_{S2}$ is defined by the triaxial angular velocity data to which an identical index is added.

Configuration of Golf Swing Analysis Device

Figure 6:
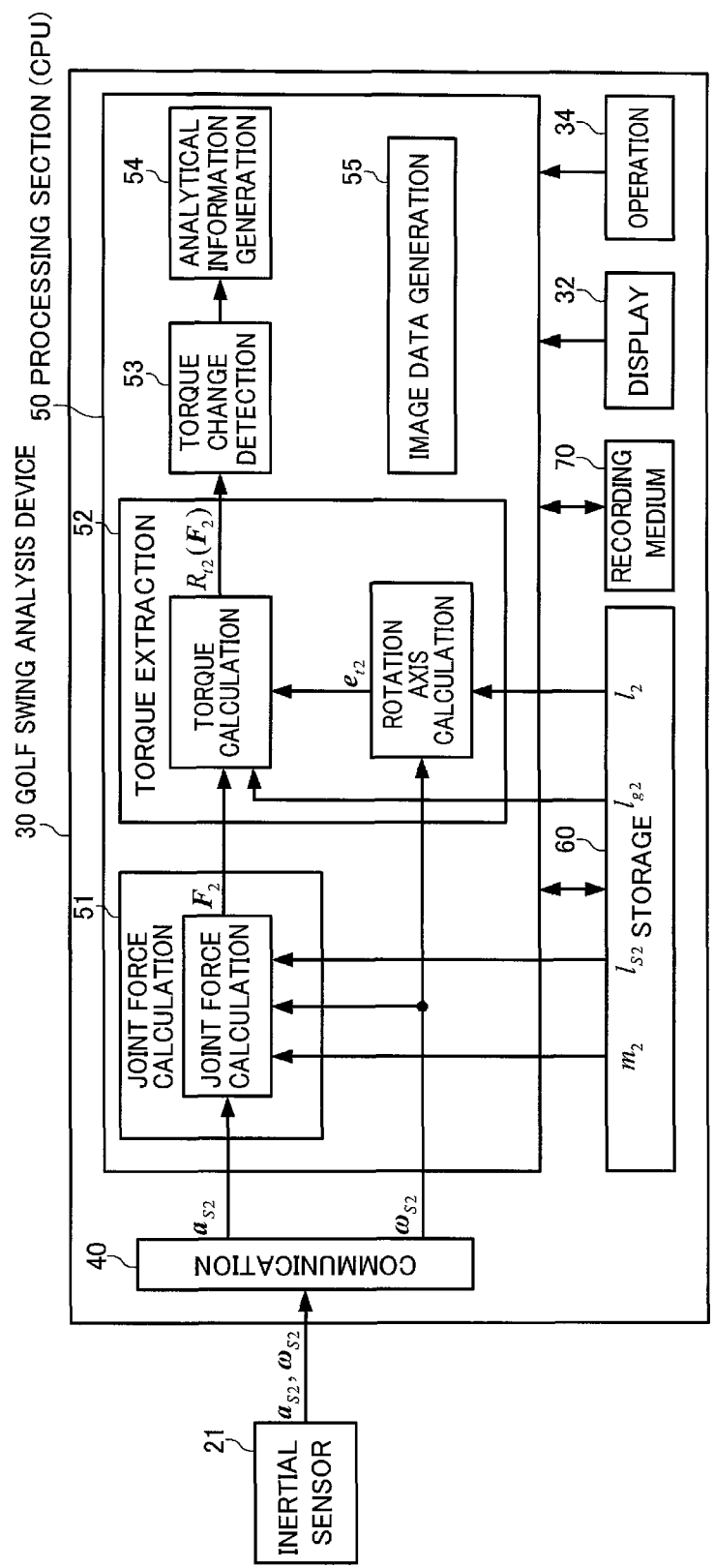
FIG. 6 is a view illustrating a configuration example of the golf swing analysis device according to the first embodiment.

FIG. 6 is a view illustrating a configuration example of the golf swing analysis device 30 according to the first embodiment. As illustrated in FIG. 6, the golf swing analysis device 30 according to the first embodiment includes the display section 32, the operation section 34, a communication section 40, a processing section (CPU) 50, a storage section 60, and a recording medium 70. Note that the golf swing analysis device 30 according to the first embodiment may have a configuration in which some of the elements (sections) illustrated in FIG. 6 are omitted or changed, or an additional element (section) is further provided.

The display section 32 displays the processing results of the processing section 50 or the like as characters, a graph, a three-dimensional image, or the like based on a display signal input from the processing section 50. The display section 32 is implemented by a CRT, an LCD, a touch panel display, a head-mounted display (HMD), or the like. The display section 32 may be removable from the main body of the golf swing analysis device 30.

The operation section 34 acquires an operation signal corresponding to an operation performed by the user, and transmits the operation signal to the processing section 50. The operation section 34 is implemented by a mouse, a keyboard, an operation button, a microphone, or the like. The functions of the display section 32 and the operation section 34 may be implemented by a single touch sensor display. For example, the operation section 34 may be configured so that a software button is displayed on a touch sensor display so that the user can perform an input operation using the software button, or may be configured so that the user can perform an input operation by moving a finger or the like at an arbitrary position of a touch sensor display.

The communication section 40 performs a process that receives the measurement start command or the measurement stop command from the processing section 50, and transmits the measurement start command or the measurement stop command to the inertial sensor 21, a process that receives the triaxial acceleration data and the triaxial angular velocity data transmitted from the inertial sensor 21, and transmits the triaxial acceleration data and the triaxial angular velocity data to the processing section 50, and the like.

The storage section 60 stores a program, data, and the like for the processing section 50 to perform a calculation process and a control process. The storage section 60 is used as a work area for the processing section 50, and temporarily stores the operation signal input from the operation section 34, an application program and data read from the recording medium 70, data acquired from the inertial sensor 21 through the communication section 40, the results of calculations performed by the processing section 50 according to various programs, and the like. In the first embodiment, the storage section 60 stores parameter information about the mass $m_2$ of the golf club 26 (corresponding to the mass of the second link 12 of the double pendulum model 1), parameter information about the length $l_2$ of the golf club 26 (corresponding to the length of the second link 12), parameter information about the distance $l_{g2}$ from the grip to the center of gravity of the golf club 26 (corresponding to the distance between the joint 13 and the center of gravity $12g$ of the second link 12), and parameter information about the distance $l_{S2}$ from the attachment position of the inertial sensor 21 to the center of gravity of the golf club 26 (corresponding to the center of gravity $12g$ of the second link 12). For example, the user may input the parameter information via the operation section 34, and store the parameter information in the storage section 60, or the parameter information that was previously input may be stored in the storage section 60. Alternatively, given parameter information may be stored in the storage section 60 in advance, and the inertial sensor 21 may be attached at a given position of a specific golf club 26 so that the parameter information coincides with the given parameter information.

The recording medium 70 is a computer-readable recording medium for storing various application programs and data. In the first embodiment, an application program (golf swing analysis program) that causes a computer to function as the golf swing analysis device 30 is stored in the recording medium 70. The recording medium 70 may function as a recording section that records data that has been generated by the processing section 50 and must be stored for a long time. The recording medium 70 may be implemented by an optical disk (CD or DVD), a magneto-optical disk (MO), a magnetic disk, a hard disk, a magnetic tape, a memory (ROM or flash memory), or the like.

The processing section 50 performs a calculation process based on the data acquired from the inertial sensor 21 through the communication section 40, and a control process (e.g., a control process that controls transmission of the measurement start command or the measurement stop command to the inertial sensor 21, and a control process that controls display of the display section 32) according to the program stored in the storage section 60 and the application program stored in the recording medium 70. In the first embodiment, the processing section 50 functions as a joint force calculation section 51, a torque extraction section 52, a torque change detection section 53, an analytical information generation section 54, and an image data generation section 55 described below by executing the golf swing analysis program stored in the recording medium 70. Note that the golf swing analysis program may be received from a server connected to a cable or wireless communication network, and stored in the storage section 60 or the recording medium 70. At least some of the above sections may be implemented by hardware (dedicated circuit).

The joint force calculation section 51 calculates the joint force $F_2$ that is applied to the joint 13 of the double pendulum model 1 using the accelerations measured by the inertial sensor 21.

The torque extraction section 52 extracts a torque that causes the second link 12 to make a rotational motion around the first axis from the joint force $F_2$ calculated by the joint force calculation section 51. In the first embodiment, the torque extraction section 52 extracts a torque that causes the second link 12 to make a rotational motion around the axis orthogonal to the longitudinal axis ($l_2$-axis) of the second link 12. For example, the torque extraction section 52 extracts a torque that causes the second link 12 to make a rotational motion around the axis ($t_2$-axis) orthogonal to the longitudinal axis ($l_2$-axis) of the second link 12 and the travel direction ($q_2$-axis) of the second link 12.

The torque change detection section 53 detects the timing at which the sign of the torque extracted by the torque extraction section 52 changes.

The analytical information generation section 54 generates analytical information about a natural swing based on the timing detected by the torque change detection section 53 at which the sign of the torque $R_{t2}(F_2)$ changes.

The image data generation section 55 generates image data based on the torque $R_{t2}(F_2)$ extracted by the torque extraction section 52 and the analytical information generated by the analytical information generation section 54. The image data generated by the image data generation section 55 is displayed on the display section 32.

Process Performed by Golf Swing Analysis System

FIGS. 7A and 7B are flowcharts illustrating an example of the process performed by the golf swing analysis system 20 according to the first embodiment. FIG. 7A is a flowchart illustrating the process performed by the processing section 50 of the golf swing analysis device 30, and FIG. 7B is a flowchart illustrating the process performed by the data processing section 110 of the inertial sensor 21.

The processing section 50 of the golf swing analysis device 30 (hereinafter referred to as "processing section 50") determines whether or not a measurement start event for the inertial sensor 21 has occurred (S10). For example, the processing section 50 may display a measurement start button on the display section 32, and the measurement start event may occur when the user has pressed the measurement start button.

The processing section 50 stands by until the measurement start event occurs (N in S10). When the measurement start event has occurred (Y in S10), the processing section 50 generates the measurement start command, and transmits the measurement start command to the inertial sensor 21 through the communication section 40 (S12).

The data processing section 110 of the inertial sensor 21 (hereinafter referred to as "data processing section 110") stands by until the measurement start command is received (N in S50). When the measurement start command has been received (Y in S50), the data processing section 110 causes the triaxial acceleration sensors (acceleration sensors $100x$, $100y$, and $100z$) and the triaxial angular velocity sensors (angular velocity sensors $102x$, $102y$, and $102z$) to start measurement (S52).

The data processing section 110 acquires the acceleration data (triaxial acceleration data) measured by the triaxial acceleration sensors and the angular velocity data (triaxial angular velocity data) measured by the triaxial angular velocity sensors each time the sampling cycle deltat (e.g., 1 ms) has elapsed (Y in S54), and stores the acceleration data and the angular velocity data in the storage section 130 (S56).

The processing section 50 determines whether or not a measurement stop event for the inertial sensor 21 has occurred after transmitting the measurement start command to the inertial sensor 21 (S14). For example, the processing section 50 may display a measurement stop button on the display section 32, and the measurement stop event may occur when the user has pressed the measurement stop button. Alternatively, the measurement stop event may automatically occur when a given time has elapsed after the measurement start command has been transmitted.

The processing section 50 stands by until the measurement stop event occurs (N in S14). When the measurement stop event has occurred (Y in S14), the processing section 50 generates the measurement stop command, and transmits the measurement stop command to the inertial sensor 21 through the communication section 40 (S16).

The data processing section 110 repeats the steps S54 and S56 until the measurement stop command is received (N in S58). When the measurement stop command has been received (Y in S58), the data processing section 110 causes the triaxial acceleration sensors and the triaxial angular velocity sensors to stop measurement (S60).

The data processing section 110 sequentially reads the triaxial acceleration data and the triaxial angular velocity data stored in the storage section 130, adds an index to the triaxial acceleration data and the triaxial angular velocity data, and transmits the triaxial acceleration data and the triaxial angular velocity data to the golf swing analysis device 30 (S62) to complete the process.

The processing section 50 receives the triaxial acceleration data and the triaxial angular velocity data measured by the inertial sensor 21 (S18), and determines whether or not a golf swing analysis start event has occurred (S20). For example, the processing section 50 may display a swing analysis button on the display section 32, and the analysis start event may occur when the user has pressed the swing analysis button. Alternatively, the analysis start event may automatically occur when the triaxial acceleration data and the triaxial angular velocity data have been received in the step S18.

The processing section 50 stands by until the analysis start event occurs (N in S20). When the analysis start event has occurred (Y in S20), the processing section 50 generates time-series data of the torque $R_{t2}(F_2)$ that causes a rotational motion around the $t_2$-axis and analytical information about natural uncock using the triaxial acceleration data and the triaxial angular velocity data measured by the inertial sensor 21 (S22).

The processing section 50 then functions as the image data generation section 55 to generate image data based on the time-series data of the torque $R_{t2}(F_2)$ and the analytical information about natural uncock generated in the step S22, and displays the image data on the display section 32 (S24) to complete the process.

Figure 8:
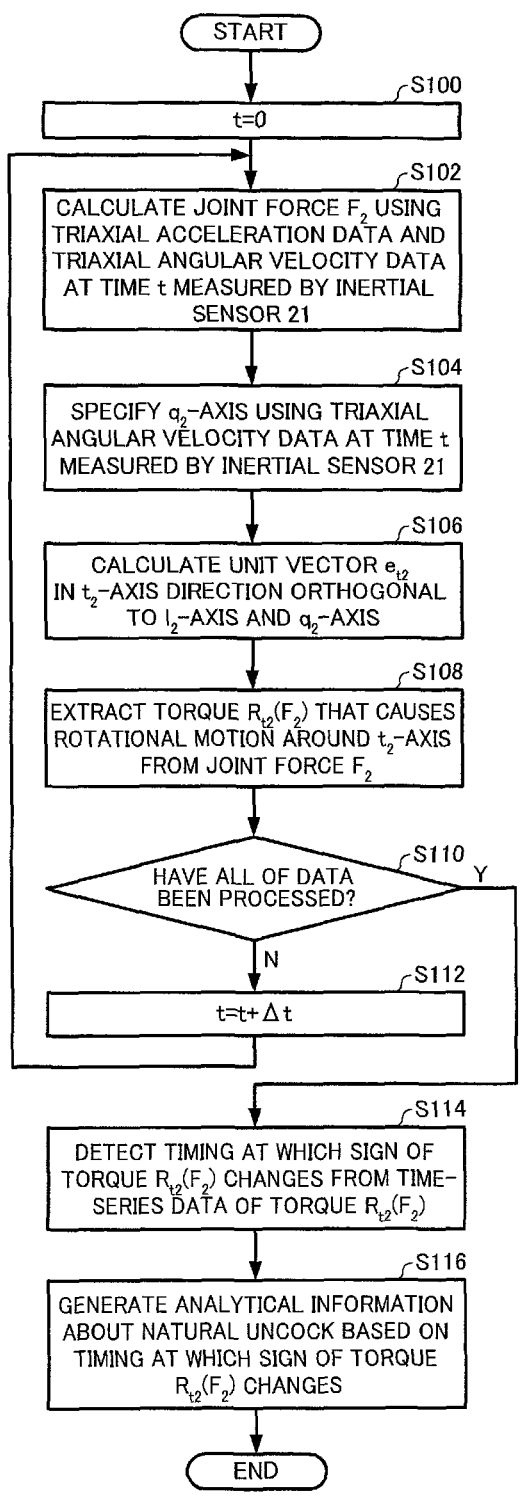
FIG. 8 is a flowchart illustrating an example of the process performed in the step S22 in FIG. 7A.

FIG. 8 is a flowchart illustrating an example of the process performed in the step S22 in FIG. 7A. As illustrated in FIG. 8, the processing section 50 initializes the time variable t to 0 (S100), and then functions as the joint force calculation section 51 to calculate the joint force $F_2$ using the triaxial acceleration data (acceleration vector $a_{S2}$) and the triaxial angular velocity data (angular velocity vector $omega_{S2}$) at time t measured by the inertial sensor 21 (S102). For example, the processing section 50 calculates the translational acceleration vector of the center of gravity 12g of the second link 12 at time t in the sensor coordinate system $sigma_{S2}$ according to the following expression (18) using the acceleration vector $a_{S2}$ at time t, the angular velocity vector $omega_{S2}$ at time t, the unit vector $e_{l2}$ in the $l_2$-axis direction (i.e., the unit vector in the y-axis direction in the sensor coordinate system $sigma_{S2}$), and the parameter information $l_{S2}$.

$$\ddot{g}_{g2} - g = a_{S2} = a_{S2} + \dot{\omega}_{S2} \times l_{S2} e_{l2} + \omega_{S2} \times (\omega_{S2} \times l_{S2} e_{l2}) \quad (18)$$

The processing section 50 (joint force calculation section 51) calculates the joint force (force vector) $F_2$ at time t in the sensor coordinate system $sigma_{S2}$ according to the expression (9) using the translational acceleration vector of the center of gravity 12g and the parameter information $m_2$. Since the acceleration vector $a_{S2}$ approximately coincides with the translational acceleration vector of the center of gravity 12g when the inertial sensor 21 is attached in the vicinity of the center of gravity of the golf club 26 (corresponding to the center of gravity 12g of the second link 12), the joint force $F_2$ can be calculated directly according to the expression (9) using the acceleration vector $a_{S2}$ and the parameter information $m_2$.

The processing section 50 then functions as the torque extraction section 52 to specify the $q_2$-axis using the triaxial angular velocity data (angular velocity vector $omega_{S2}$) at time t measured by the inertial sensor 21 (S104). For example, the processing section 50 (torque extraction section 52) calculates the unit vector $e_{q2}$ in the $q_2$-axis direction at time t in the sensor coordinate system $sigma_{S2}$ according to the following expression (19) using the angular velocity vector $omega_{S2}$ at time t, the unit vector $e_{l2}$ in the $l_2$-axis direction, and the parameter information $l_2$.

$$e_{q2} = \omega_{S2} \times l_2 e_{l2} \quad (19)$$

The processing section 50 then calculates the unit vector $e_{t2}$ in the $t_2$-axis direction orthogonal to the $l_2$-axis and the $q_2$-axis (S106). For example, the processing section 50 (torque extraction section 52) calculates the unit vector $e_{t2}$ in the $t_2$-axis direction at time t in the sensor coordinate system $sigma_{S2}$ according to the expression (14) using the unit vector $e_{l2}$ in the $l_2$-axis direction and the unit vector $e_{q2}$ in the $q_2$-axis direction calculated in the step S104.

The processing section 50 then extracts the torque $R_{t2}(F_2)$ that causes a rotational motion around the $t_2$-axis from the joint force $F_2$ calculated in the step S102 (step S108). For example, the processing section 50 (torque extraction section 52) calculates the torque $R_{t2}(F_2)$ at time t in the sensor coordinate system $sigma_{S2}$ according to the expression (15) using the unit vector $e_{l2}$ in the $l_2$-axis direction, the unit vector $e_{t2}$ in the $t_2$-axis direction calculated in the step S106, the joint force $F_2$ calculated in the step S102, and the parameter information $l_{g2}$.

The processing section 50 repeats the steps S102 to S108 while updating the time variable t with t+deltat (S112) until the steps S102 to S108 are performed on all of the analysis target data (N in S110).

When the steps S102 to S108 have been performed on all of the analysis target data (Y in S110), the processing section 50 functions as the torque change detection section 53 to detect the timing at which the sign of the torque $R_{t2}(F_2)$ changes from the time-series data (data arranged in time series) of the torque $R_{t2}(F_2)$ in the sensor coordinate system $sigma_{S2}$ obtained by repeating the steps S102 to S108 (S114). For example, the processing section 50 (torque change detection section 53) detects the timing at which the sign of the torque $R_{t2}(F_2)$ changes from negative to positive based on the time-series data of the torque $R_{t2}(F_2)$.

The processing section 50 then functions as the analytical information generation section 54 to generate the analytical information about natural uncock based on the timing detected in the step S114 at which the sign of the torque $R_{t2}(F_2)$ changes. For example, since the condition indicated by the expression (17) is satisfied when the sign of the torque $R_{t2}(F_2)$ is positive, the processing section 50 (analytical information generation section 54) may generate the analytical information that indicates the first timing or the last timing at which the sign of the torque $R_{t2}(F_2)$ changes from negative to positive as the timing at which a transition to a natural swing occurs. Alternatively, the processing section 50 (analytical information generation section 54) may generate the analytical information that indicates a timing between the first timing and the last timing at which the sign of the torque $R_{t2}(F_2)$ changes from negative to positive as the timing at which a transition to a natural swing occurs taking account of the effects of a calculation error and noise.

Figure 9:
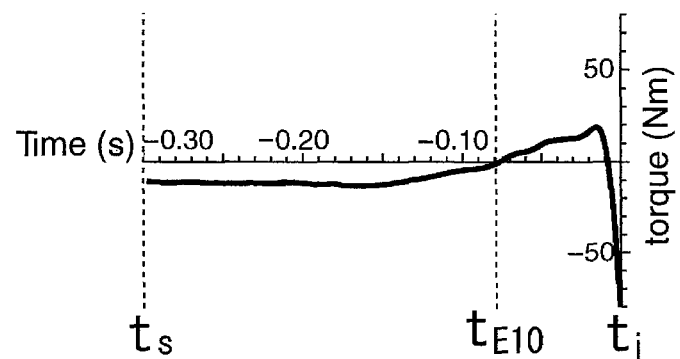
FIG. 9 is a view illustrating an example of a two-dimensional graph image of a torque $R_{r2}(F_2)$.

In the step S24 in FIG. 7A (flowchart), the processing section 50 (image data generation section 55) may convert the time-series data of the torque $R_{t2}(F_2)$ in the sensor coordinate system $sigma_{S2}$ generated according to the flowchart illustrated in FIG. 8 into image data of a two-dimensional graph in which the horizontal axis indicates time and the vertical axis indicates the torque value, and display the image data (two-dimensional graph) on the display section 32, for example. FIG. 9 illustrates an example of a two-dimensional graph image of the torque $R_{t2}(F_2)$ obtained by the actual measurement of a golf swing. In FIG. 9, $t_i$ is the impact timing, and $t_s$ is a timing 0.3 seconds before the impact timing. The golfer compares the two-dimensional graph image illustrated in FIG. 9 with a two-dimensional graph of the torque $R_{t2}(F_2)$ during an ideal swing (i.e., a swing made by a professional golfer) in which the vicinity of the time $t_{E10}$ at which the sign of the torque $R_{t2}(F_2)$ changes from negative to positive can be estimated to be the natural uncock timing, and analyzes the difference (shift) in natural uncock timing and the like.

The processing section 50 may display the analytical information about natural uncock (i.e., the timing at which a transition to a natural swing occurs) generated according to the flowchart illustrated in FIG. 8 on the display section 32 as character information or image information, for example. When the golf swing analysis device 30 includes a sound output section (speaker), the golf swing analysis device 30 may output the analytical information about natural uncock as sound. It is possible to reduce the burden imposed on the golfer due to detailed analysis by providing the timing at which a transition to a natural swing occurs.

Since the golf swing analysis system (golf swing analysis device) according to the first embodiment can provide the information about the torque that contributes to a rotational motion around the $t_2$-axis (i.e., a rotational motion in which the $q_2$-axis direction (i.e., the travel direction of the second link 12) is a tangent) around the joint 13 of the double pendulum model 1, the golfer can analyze the timing at which a transition to a natural swing occurs using the information. Moreover, the golfer can easily estimate the natural swing start timing from the information about the timing at which the direction of the torque changes.

2-2. Second Embodiment

Outline of Golf Swing Analysis System

Figure 10:
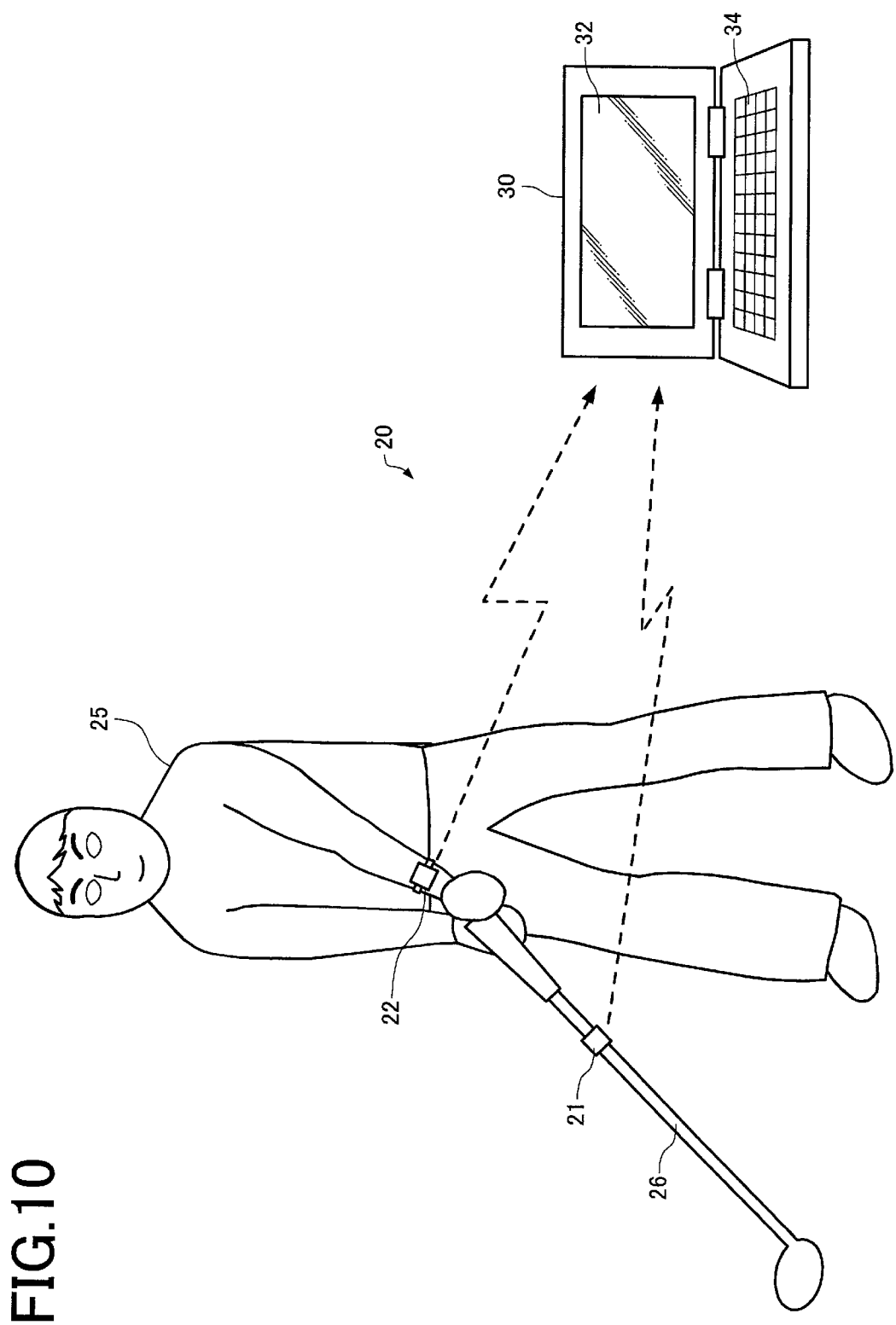
FIG. 10 is a view illustrating an outline of a golf swing analysis system according to a second embodiment.

FIG. 10 is a view illustrating an outline of the golf swing analysis system according to a second embodiment. As illustrated in FIG. 10, a golf swing analysis system 20 according to the second embodiment includes an inertial sensor 21 (first inertial sensor), an inertial sensor 22 (second inertial sensor), and a golf swing analysis device 30. The golf swing analysis system 20 according to the second embodiment differs from the golf swing analysis system 20 according to the first embodiment in that the golf swing analysis system 20 according to the second embodiment includes the inertial sensor 22.

The inertial sensor 22 can measure triaxial accelerations and triaxial angular velocities, and is attached at a position at which the motion of the upper part of the body of a golfer 25 can be measured. The inertial sensor 22 may be attached to the forearm, the upper arm, or the shoulder of the golfer, for example. The inertial sensor 22 measures the triaxial accelerations and the triaxial angular velocities during a period including the start and the end of the swing in the same manner as the inertial sensor 21, and transmits the measured triaxial acceleration data and triaxial angular velocity data to the golf swing analysis device 30. The data communication between the inertial sensor 22 and the golf swing analysis device 30 may be implemented by wireless communication, or may be implemented by cable communication.

The golf swing analysis device 30 receives the triaxial acceleration data and the triaxial angular velocity data measured by the inertial sensor 21, receives the triaxial acceleration data and the triaxial angular velocity data measured by the inertial sensor 22, generates information that makes it possible to analyze the natural uncock timing, and displays the information on a display section 32.

The remaining configuration of the golf swing analysis system according to the second embodiment is the same as that of the golf swing analysis system according to the first embodiment. Therefore, description thereof is omitted.

Configuration of Inertial Sensor

The inertial sensor 21 is configured in the same manner as illustrated in FIG. 5. Therefore, description thereof is omitted. The inertial sensor 22 may also be configured in the same manner as illustrated in FIG. 5. Therefore, illustration and detailed description thereof are omitted.

In the second embodiment, the attachment position and the attachment angle of the inertial sensor 21 are the same as those described above in connection with the first embodiment. The inertial sensor 22 is attached so that the y-axis extends along the longitudinal axis direction of the forearm, and the x-axis and the z-axis are vertical to the longitudinal axis direction of the forearm. A sensor coordinate system $sigma_{S2}$ is defined by the x-axis, the y-axis, and the z-axis of the inertial sensor 21, and a sensor coordinate system $sigma_{S1}$ is defined by the x-axis, the y-axis, and the z-axis of the inertial sensor 22.

Configuration of Golf Swing Analysis Device

Figure 11:
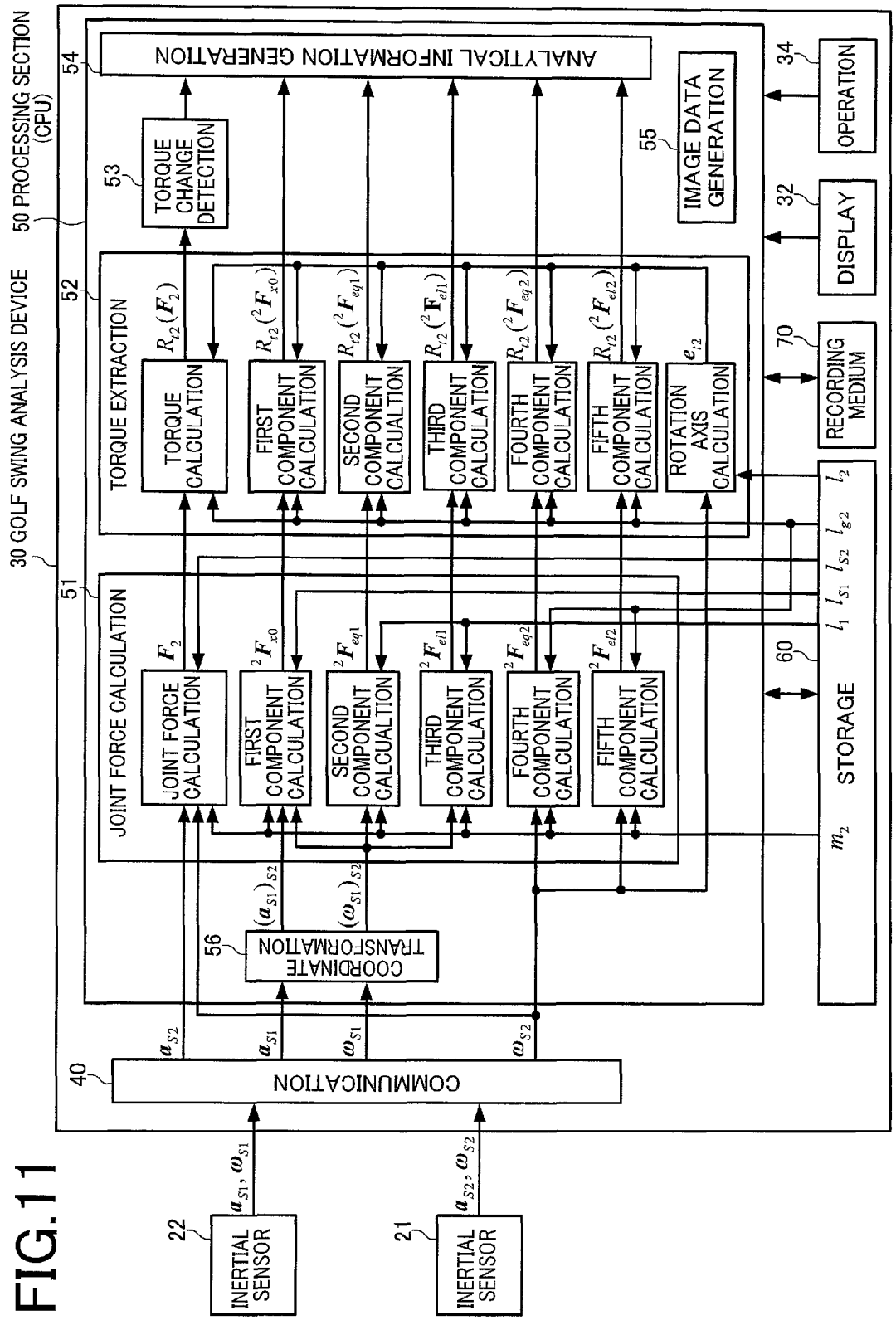
FIG. 11 is a view illustrating a configuration example of a golf swing analysis device according to the second embodiment.

FIG. 11 is a view illustrating a configuration example of the golf swing analysis device 30 according to the second embodiment. As illustrated in FIG. 11, the golf swing analysis device 30 according to the second embodiment includes the elements described above in connection with the first embodiment.

The configuration and the function of the display section 32, the operation section 34, and the recording medium 70 are the same as those described above in connection with the first embodiment. Therefore, description thereof is omitted.

The communication section 40 performs a process that receives the measurement start command or the measurement stop command from the processing section 50, and transmits the measurement start command or the measurement stop command to the inertial sensor 22, a process that receives the triaxial acceleration data and the triaxial angular velocity data transmitted from the inertial sensor 22, and transmits the triaxial acceleration data and the triaxial angular velocity data to the processing section 50, and the like in addition to the processes described above in connection with the first embodiment.

The storage section 60 has the functions described above in connection with the first embodiment, and is also used to temporarily store the data acquired from the inertial sensor 22 through the communication section 40. In the second embodiment, the storage section 60 stores parameter information about the distance 1 between the center point between the shoulders of the golfer 25 and the grip of a golf club 26 (corresponding to the length of the first link 11), and parameter information about the distance $l_{S1}$ between the center point between the shoulders of the golfer 25 and the attachment position of the inertial sensor 22 in addition to the parameter information $m_2$, the parameter information $l_2$, the parameter information $l_{g2}$, and the parameter information $l_{S2}$ described above in connection with the first embodiment.

The processing section 50 performs a calculation process based on the data acquired from the inertial sensor 22 through the communication section 40 in addition to the processes described above in connection with the first embodiment. In the second embodiment, the processing section 50 functions as a joint force calculation section 51, a torque extraction section 52, a torque change detection section 53, an analytical information generation section 54, an image data generation section 55, and a coordinate transformation section 56 by executing the golf swing analysis program stored in the recording medium 70. Note that at least some of the above sections may be implemented by hardware (dedicated circuit).

The joint force calculation section 51 performs a process that calculates at least one component among a plurality of components obtained by decomposing the joint force $F_2$ using at least one of the angular velocities measured by the inertial sensor 21, the accelerations measured by the inertial sensor 22, and the angular velocities measured by the inertial sensor 22 in addition to the processes described above in connection with the first embodiment. In the second embodiment, the joint force calculation section 51 calculates the first component $^2F_{x0}$, the second component $^2F_{eq1}$, the third component $^2F_{el1}$, the fourth component $^2F_{el2}$, and the fifth component $^2F_{el2}$ of the joint force $F_2$ indicated by the expression (12).

The torque extraction section 52 performs a process that extracts a torque component that causes a rotational motion around the first axis from each component of the joint force $F_2$ in addition to the process described above in connection with the first embodiment. In the second embodiment, the torque extraction section 52 extracts the torque components $R_{t2}(^2F_{x0})$, $R_{t2}(^2F_{eq1})$, $R_{t2}(^2F_{el1})$, $R_{t2}(^2F_{eq2})$, and $R_{t2}(^2F_{el2})$ indicated by the expression (16) from the five components of the joint force $F_2$.

The torque change detection section 53 performs the process described above in connection with the first embodiment.

The analytical information generation section 54 performs a process that generates analytical information about a natural swing (analytical information about natural uncock) using the timing detected by the torque change detection section 53 at which the sign of the torque $R_{t2}(F_2)$ changes, and the five torque components extracted by the torque extraction section 52.

The image data generation section 55 performs a process that generates image data based on the torque $(R_{t2}(F_2))$ and the torque components $R_{t2}(^2F_{x0})$, $R_{t2}(^2F_{eq1})$, $R_{t2}(^2F_{el1})$, $R_{t2}(^2F_{eq2})$, and $R_{t2}(^2F_{el2})$ extracted by the torque extraction section 52, and the analytical information generated by the analytical information generation section 54. The image data generated by the image data generation section 55 is displayed on the display section 32.

The coordinate transformation section 56 performs a process that transforms the triaxial acceleration data and the triaxial angular velocity data in the sensor coordinate system sigma$_{S1}$ measured by the inertial sensor 22 into triaxial acceleration data and triaxial angular velocity data in the sensor coordinate system sigma$_{S2}$.

Process Performed by Golf Swing Analysis System

A flowchart of the process performed by the data processing section 110 of the inertial sensor 21 according to the second embodiment, and a flowchart of the process performed by the data processing section 110 of the inertial sensor 22 according to the second embodiment are the same as the flowchart illustrated in FIG. 7B. Therefore, illustration and description thereof are omitted.

Figure 12:
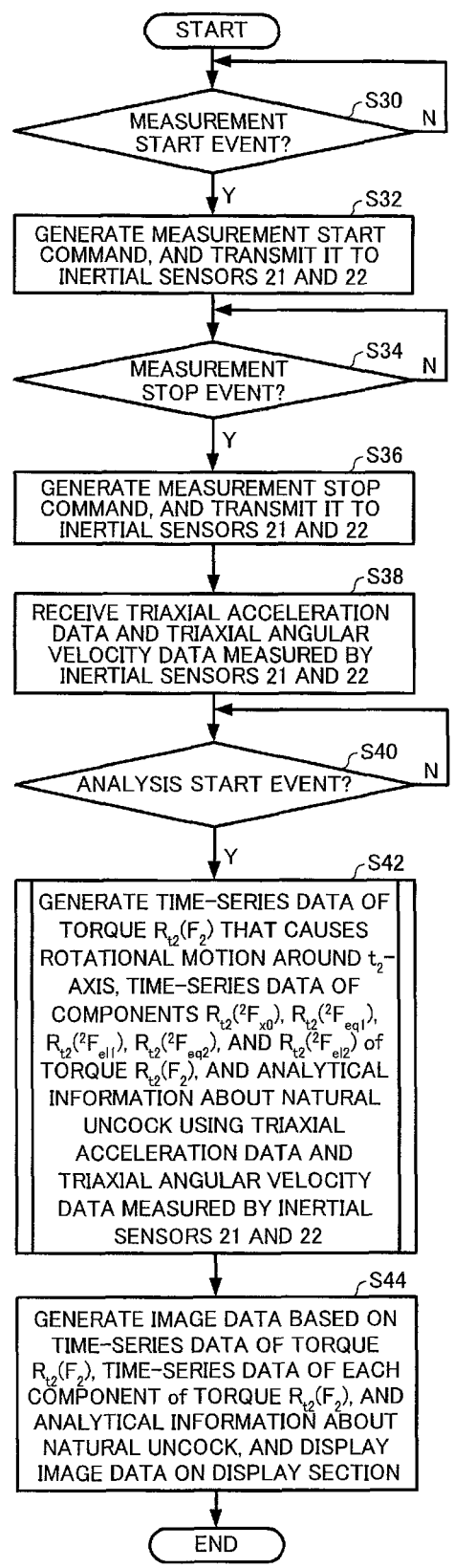
FIG. 12 is a view illustrating an example of a process performed by the golf swing analysis device according to the second embodiment.

FIG. 12 is a flowchart illustrating an example of the process performed by the processing section 50 of the golf swing analysis device 30 according to the second embodiment. As illustrated in FIG. 12, the processing section 50 of the golf swing analysis device 30 (hereinafter referred to as "processing section 50") stands by until the measurement start event for the inertial sensor 21 and the inertial sensor 22 occurs (N in S30). When the measurement start event has occurred (Y in S30), the processing section 50 generates the measurement start command, and transmits the measurement start command to the inertial sensor 21 and the inertial sensor 22 through the communication section 40 (S32).

The processing section 50 then stands by until the measurement stop event for the inertial sensor 21 and the inertial sensor 22 occurs (N in S34). When the measurement stop event has occurred (Y in S34), the processing section 50 generates the measurement stop command, and transmits the measurement stop command to the inertial sensor 21 and the inertial sensor 22 through the communication section 40 (S36).

The processing section 50 receives the triaxial acceleration data and the triaxial angular velocity data measured by the inertial sensor 21 and the inertial sensor 22 (S38).

The processing section 50 then stands by until the golf swing analysis start event occurs (N in S40). When the analysis start event has occurred (Y in S40), the processing section 50 generates time-series data of the torque $R_{t2}(F_2)$ that causes a rotational motion around the $t_2$-axis, time-series data of the components $R_{t2}(^2F_{x0})$, $R_{t2}(^2F_{eq1})$, $R_{t2}(^2F_{el1})$, $R_{t2}(^2F_{eq2})$, and $R_{t2}(^2F_{el2})$ of the torque $R_{t2}(F_2)$, and analytical information about natural uncock using the triaxial acceleration data and the triaxial angular velocity data measured by the inertial sensor 21 and the inertial sensor 22 (S42).

The processing section 50 then functions as the image data generation section 55 to generate image data based on the time-series data of the torque $R_{t2}(F_2)$, the time-series data of each component of the torque $R_{t2}(F_2)$, and the analytical information about natural uncock generated in the step S42, and displays the image data on the display section 32 (S44) to complete the process.

Figure 13:
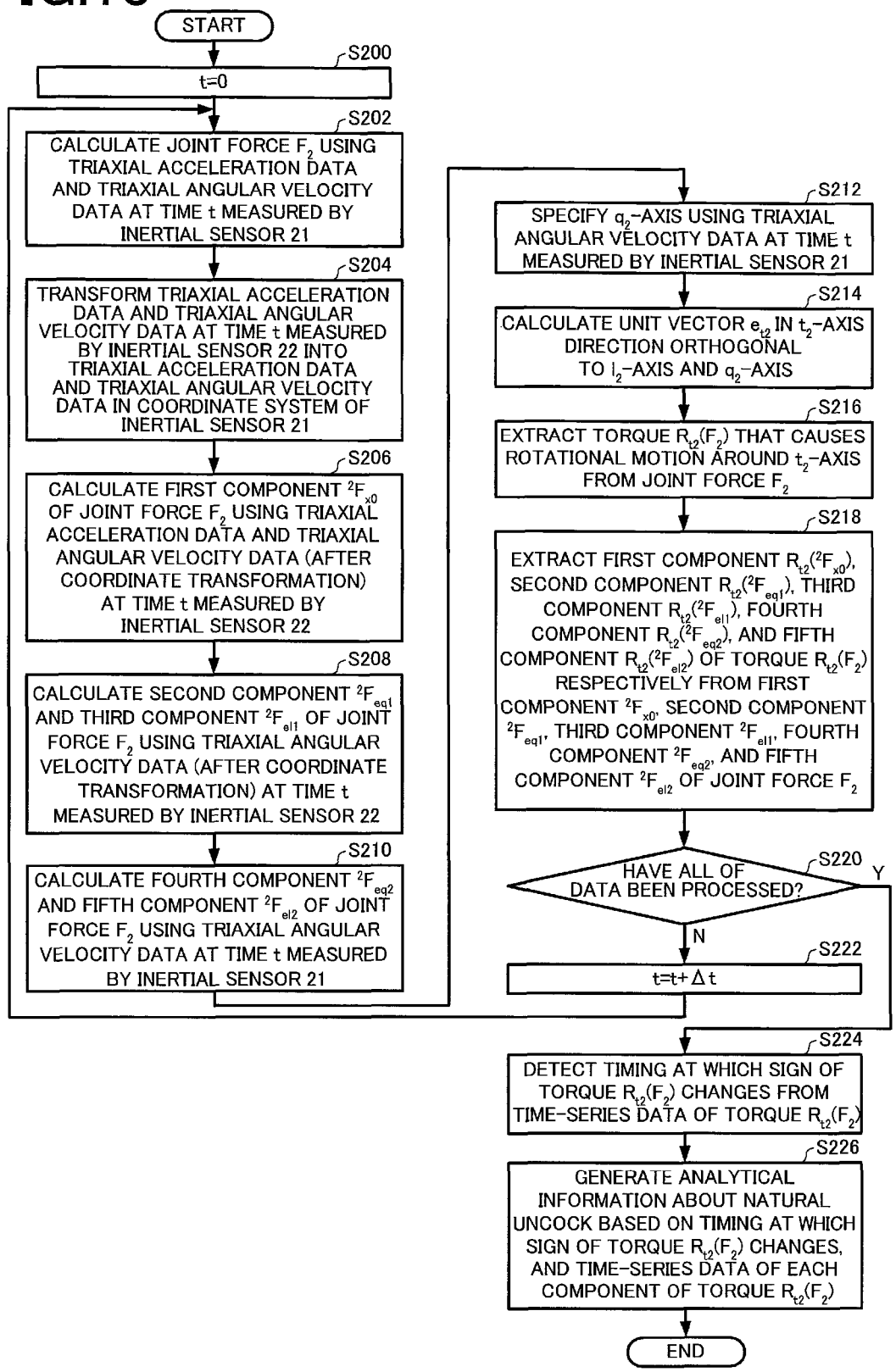
FIG. 13 is a flowchart illustrating an example of the step S42 in FIG. 12.

FIG. 13 is a flowchart illustrating an example of the step S42 in FIG. 12. As illustrated in FIG. 13, the processing section 50 performs steps S200 and S202 in the same manner as the steps S100 and S102 in FIG. 8 to calculate the joint force $F_2$.

The processing section 50 functions as the coordinate transformation section 56 to transform the triaxial acceleration data (acceleration vector $a_{S1}$) and the triaxial angular velocity data (angular velocity vector omega$_{S1}$) at time t measured by the inertial sensor 22 into triaxial acceleration data and triaxial angular velocity data in the coordinate system (sensor coordinate system sigma$_{S2}$) of the inertial sensor 21 (S204).

The processing section 50 then functions as the joint force calculation section 51 to calculate the first component $^2F_{x0}$ of the joint force $F_2$ using the triaxial acceleration data (acceleration vector $a_{S2}$) and the triaxial angular velocity data (angular velocity vector omega$_{S2}$) at time t (in the sensor coordinate system sigma$_{S2}$) measured by the inertial sensor 22 (S206). For example, the processing section 50 (joint force calculation section 51) calculates the translational acceleration vector of the fulcrum 10 at time t in the sensor coordinate system sigma$_{S2}$ according to the following expression (20) using the acceleration vector $a_{S1}$ at time t in the sensor coordinate system sigma$_{S2}$, the angular velocity vector omega$_{S1}$ at time t in the sensor coordinate system sigma$_{S2}$, the unit vector $e_{l1}$ in the $l_1$-axis direction at time t in the sensor coordinate system sigma$_{S2}$ (i.e., the unit vector in the y-axis direction in the sensor coordinate system sigma$_{S1}$), and the parameter information $l_{S1}$.

$$\ddot{x}_0 - g = a_{S1} + \dot{\omega}_{S1} \times l_{S1} e_{l1} + \omega_{S1} \times (\omega_{S1} \times l_{S1} e_{l1}) \quad (20)$$

The processing section 50 (joint force calculation section 51) calculates the first component $^2F_{x0}$ of the joint force $F_2$ at time t in the sensor coordinate system sigma$_{S2}$ from the first term of the right side of the expression (12) using the translational acceleration vector of the fulcrum 10 and the parameter information $m_2$. Since the acceleration vector $a_{S1}$ approximately coincides with the translational acceleration vector of the fulcrum 10 when the inertial sensor 22 is attached in the vicinity of the center point between the shoulders of the golfer 25 (corresponding to the fulcrum 10), the first component $^2F_{x0}$ of the joint force $F_2$ can be calculated directly from the first term of the right side of the expression (12) using the acceleration vector $a_{S1}$ and the parameter information $m_2$.

The processing section 50 then calculates the second component $^2F_{eq1}$ and the third component $^2F_{el1}$ of the joint force $F_2$ using the triaxial angular velocity data (angular velocity vector $omega_{S1}$) (after coordinate transformation (in the sensor coordinate system $sigma_{S2}$)) at time t measured by the inertial sensor 22 (S208). For example, the processing section 50 (joint force calculation section 51) calculates the angular acceleration vector $(omega_1)\cdot \times l_1 e_{l1}$ ($(omega_1)\cdot$ indicates the first-order differentiation of $omega_1$) of the first link 11 at time t in the sensor coordinate system $sigma_{S2}$ using the angular velocity vector $omega_{S1}$ (=$omega_1$) at time t in the sensor coordinate system $sigma_{S2}$, the unit vector en in the $l_1$-axis direction at time t in the sensor coordinate system $sigma_{S2}$, and the parameter information $l_1$, and calculates the second component $^2F_{eq1}$ of the joint force $F_2$ at time t in the sensor coordinate system $sigma_{S2}$ from the second term of the right side of the expression (12) using the angular acceleration vector $(omega_1)\cdot \times l_1 e_{l1}$ and the parameter information $m_2$. Likewise, the processing section 50 (joint force calculation section 51) calculates the centripetal acceleration vector $omega_1 \times (omega_1 \times l_1 e_{l1})$ of the first link 11 at time t in the sensor coordinate system $sigma_{S2}$ using the angular velocity vector $omega_{S1}$ (=$omega_1$) at time t in the sensor coordinate system $sigma_{S2}$, the unit vector $e_{l1}$ in the $l_1$-axis direction at time t in the sensor coordinate system $sigma_{S2}$, and the parameter information $l_1$, and calculates the third component $^2F_{el1}$ of the joint force $F_2$ at time t in the sensor coordinate system $sigma_{S2}$ from the third term of the right side of the expression (12) using the centripetal acceleration vector $omega_1 \times (omega_1 \times l_1 e_{l1})$ and the parameter information $m_2$.

The processing section 50 then calculates the fourth component $^2F_{eq2}$ and the fifth component $^2F_{el2}$ of the joint force $F_2$ using the triaxial angular velocity data (angular velocity vector $omega_{S2}$) at time t measured by the inertial sensor 21 (S210). For example, the processing section 50 (joint force calculation section 51) calculates the angular acceleration vector $(omega_2)\cdot \times l_{g2} e_{l2}$ ($(omega_2)\cdot$ indicates the first-order differentiation of $omega_2$) of the second link 12 at time t in the sensor coordinate system $sigma_{S2}$ using the angular velocity vector $omega_{S2}$ (=$omega_2$) at time t, the unit vector $e_{l2}$ in the $l_2$-axis direction, and the parameter information $l_{g2}$, and calculates the fourth component $^2F_{eq2}$ of the joint force $F_2$ at time t in the sensor coordinate system $sigma_{S2}$ from the fourth term of the right side of the expression (12) using the angular acceleration vector $(omega_2)\cdot \times l_{g2} e_{l2}$ and the parameter information $m_2$. Likewise, the processing section 50 (joint force calculation section 51) calculates the centripetal acceleration vector $omega_2 \times (omega_2 \times l_{g2} e_{l2})$ of the second link 12 at time t in the sensor coordinate system $sigma_{S2}$ using the angular velocity vector $omega_{S2}$ (=$omega_2$) at time t, the unit vector $e_{l2}$ in the $l_2$-axis direction, and the parameter information $l_{g2}$, and calculates the fifth component $^2F_{el2}$ of the joint force $F_2$ at time t in the sensor coordinate system $sigma_{S2}$ from the fifth term of the right side of the expression (12) using the centripetal acceleration vector $omega_2 \times (omega_2 \times l_{g2} e_{l2})$ and the parameter information $m_2$.

The processing section 50 then functions as the torque extraction section 52 to perform steps S212, S214, and S216 in the same manner as the steps S104, S106, and S108 in FIG. 8 to extract the torque $R_{t2}(F_2)$ from the joint force $F_2$ calculated in the step S202.

The processing section 50 then extracts the first component $R_{t2}(^2F_{x0})$, the second component $R_{t2}(^2F_{eq1})$, the third component $R_{t2}(^2F_{eq1})$, the fourth component $R_{t2}(^2F_{eq2})$, and the fifth component $R_{t2}(^2F_{el2})$ of the torque $R_{t2}(F_2)$ respectively from the first component $^2F_{x0}$, the second component $^2F_{eq1}$, the third component $^2F_{el1}$, the fourth component $^2F_{eq2}$, and the fifth component $^2F_{el2}$ of the joint force $F_2$ calculated in the steps S206 to S210 (step S218). For example, the processing section 50 (torque extraction section 52) calculates the first component $R_{t2}(^2F_{x0})$, the second component $R_{t2}(^2F_{eq1})$, the third component $R_{t2}(^2F_{el1})$, the fourth component $R_{t2}(^2F_{eq2})$, and the fifth component $R_{t2}(^2F_{el2})$ according to the expression (15) using the unit vector $e_{l2}$ in the $l_2$-axis direction, the unit vector $e_{t2}$ in the $t_2$-axis direction calculated in the step S214, each component of the joint force $F_2$ calculated in the steps S206 to S210, and the parameter information $l_{g2}$.

The processing section 50 repeats the steps S202 to S218 while updating the time variable t with t+deltat (S222) until the steps S202 to S218 are performed on all of the analysis target data (N in S220).

When the steps S202 to S218 have been performed on all of the analysis target data (Y in S220), the processing section 50 performs a step S224 in the same manner as the step S114 in FIG. 8 to detect the timing at which the sign of the torque $R_{t2}(F_2)$ changes.

The processing section 50 then functions as the analytical information generation section 54 to generate the analytical information about natural uncock based on the timing detected in the step S224 at which the sign of the torque $R_{t2}(F_2)$ changes, and the time-series data of each component of the torque $R_{t2}(F_2)$ obtained by repeating the steps S202 to S218 (S226).

In the step S44 in FIG. 12 (flowchart), the processing section 50 (image data generation section 55) may convert the time-series data of the torque $R_{t2}(F_2)$ in the sensor coordinate system $sigma_{S2}$ generated according to the flowchart illustrated in FIG. 13 into image data of a two-dimensional graph as illustrated in FIG. 9, and display the image data (two-dimensional graph) on the display section 32, for example.

Figure 14:
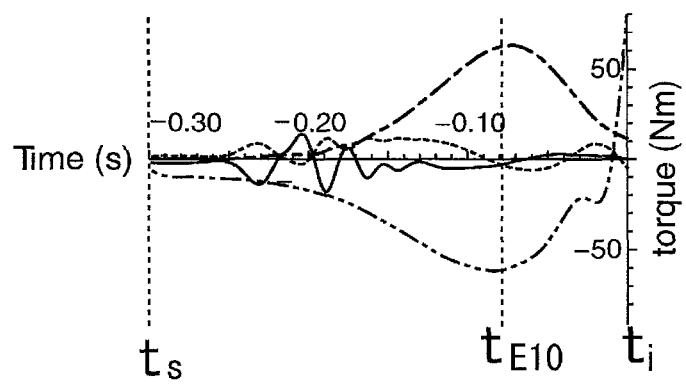
FIG. 14 is a view illustrating an example of a two-dimensional graph image including a first component to a fourth component of a torque $R_{r2}(F_2)$.

The processing section 50 (image data generation section 55) may convert the time-series data of some or all of the components of the torque $R_{t2}(F_2)$ in the sensor coordinate system $sigma_{S2}$ generated according to the flowchart illustrated in FIG. 13 into image data of a two-dimensional graph in which the horizontal axis indicates time and the vertical axis indicates the torque value, and display the image data (two-dimensional graph) on the display section 32. FIG. 14 illustrates an example of a two-dimensional graph image including the first component to the fourth component of the torque $R_{t2}(F_2)$ obtained by the actual measurement of a golf swing. In FIG. 14, $t_i$ is the impact timing, and $t_s$ is a timing 0.3 seconds before the impact timing. The solid line indicates the first component $R_{t2}(^2F_{x0})$, the broken line indicates the second component $R_{t2}(^2F_{eq1})$, the dash-dotted line indicates the third component $R_{t2}(^2F_{el1})$, and the two-dot chain line is fourth component $R_{t2}(^2F_{eq2})$. Since the fifth component $R_{t2}(^2F_{e12})$ is always 0, the fifth component $R_{t2}(^2F_{e12})$ is omitted in FIG. 14. As is clear from FIG. 14 (graph), the third component $R_{t2}(^2F_{eq2})$ derived from the centripetal force of the arm, and the fourth component $R_{t2}(^2F_{eq2})$ derived from the angular acceleration of the golf club mainly contribute to the rotational motion of the golf club. The fourth component $R_{t2}(^2F_{eq2})$ derived from the angular acceleration of the golf club contributes to a large extent in the first half of the swing, and the third component $R_{t2}(^2F_{el1})$ derived from the centripetal force of the arm contributes to a large extent in the second half of the swing. The first component $R_{t2}(^2F_{x0})$ and the second component $R_{t2}(^2F_{eq1})$ are negligibly small as compared with the third component $R_{t2}(^2F_{el1})$ and the fourth component $R_{t2}(^2F_{eq2})$. Therefore, it is considered that the timing around the time $t_{E10}$ at which the third component $R_{t2}(^2F_{el1})$ and the fourth component $R_{t2}(^2F_{eq2})$ have a relationship "$|R_{t2}(^2F_{el1})|>|R_{t2}(^2F_{eq2})|$" is the natural uncock timing. It is possible to determine the natural uncock timing, and analyze the forces that cause natural uncock in more detail by displaying a graph of each component of the torque $R_{t2}(F_2)$.

Figure 15A:
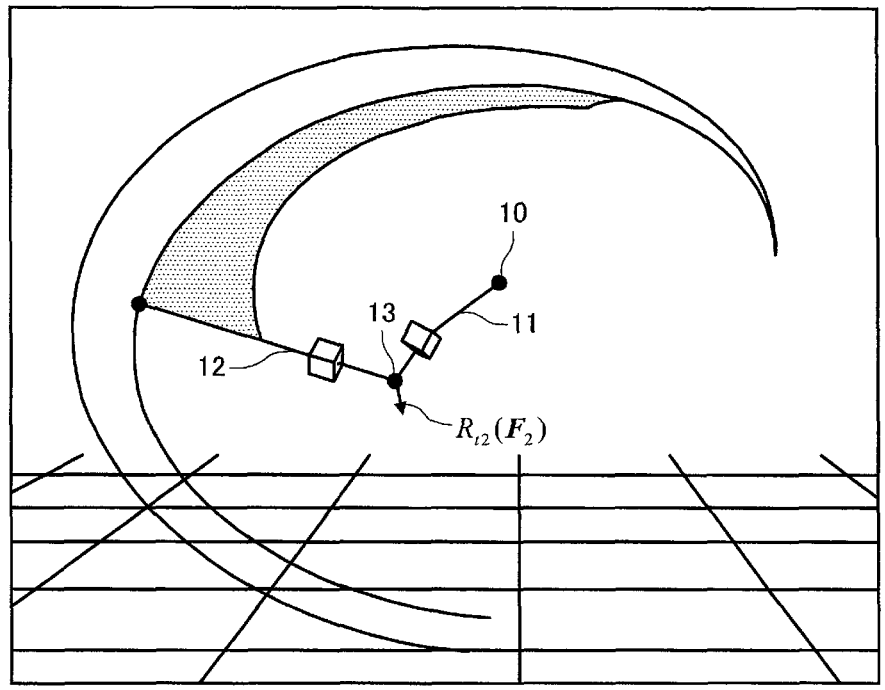
FIGS. 15A and 15B are views illustrating examples of a three-dimensional image including a torque $R_{r2}(F_2)$ and the path of a double pendulum model.
Figure 15B:
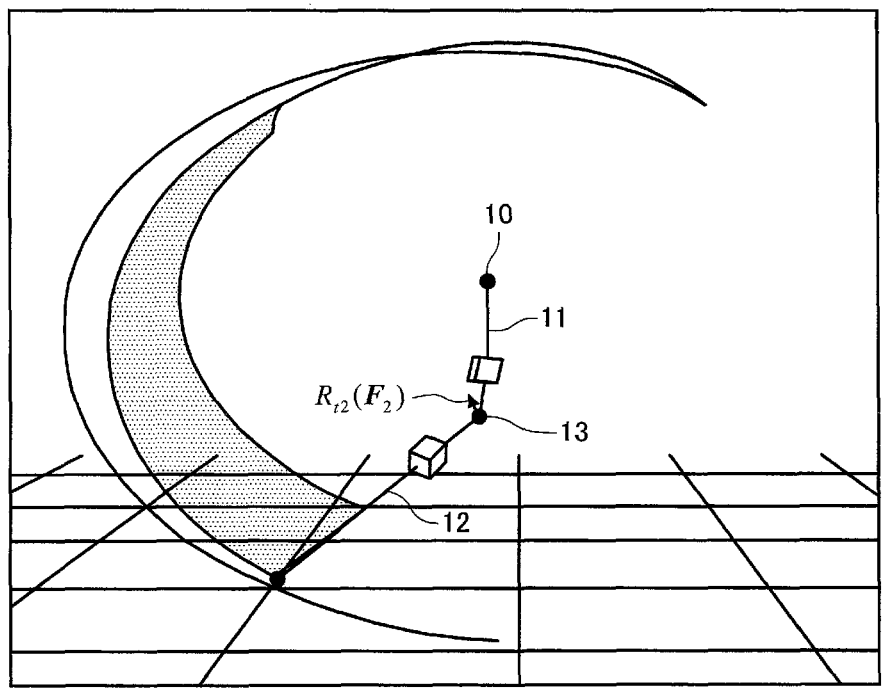

The processing section 50 (image data generation section 55) may convert the time-series data of the torque $R_{t2}(F_2)$ in the sensor coordinate system $sigma_{S2}$ into time-series data of the torque $R_{t2}(F_2)$ in the absolute coordinate system (world coordinate system) $sigma_{XYZ}$, and generate image data that indicates a change (change in magnitude) of the torque $R_{t2}(F_2)$ in the three-dimensional space having the absolute coordinate system, for example. The processing section 50 (image data generation section 55) may generate three-dimensional image data that indicates a change in position (path) of the double pendulum model 1 in the three-dimensional space having the absolute coordinate system when generating the above three-dimensional image data. The processing section 50 may calculate the path of the double pendulum model 1 by a known method using the triaxial acceleration data and the triaxial angular velocity data measured by the inertial sensor 21. FIGS. 15A and 15B illustrate examples of a three-dimensional image including the torque $R_{t2}(F_2)$ and the path of the double pendulum model 1. FIG. 15A illustrates a three-dimensional image in a relatively early stage after the start of a downswing, and FIG. 15B illustrates a three-dimensional image at a timing relatively close to the impact timing. In FIG. 15A, the direction of the torque $R_{t2}(F_2)$ is negative (downward) along the $t_2$-axis (i.e., a natural swing has not started). In FIG. 15B, the direction of the torque $R_{t2}(F_2)$ is positive (upward) along the $t_2$-axis (i.e., a natural swing has started). The golfer can visually determine that the timing at which the sign of the torque $R_{t2}(F_2)$ changes is the natural uncock timing as a result of displaying such a three-dimensional graph image. Therefore, the golfer can intuitively determine the force release timing (i.e., the shoulder rotation release timing during a swing) by comparing the three-dimensional graph image with a three-dimensional image of an ideal swing.

As described above, the golf swing analysis system (golf swing analysis device) according to the second embodiment achieves the same effects as those described above in connection with the first embodiment. Since the golf swing analysis system (golf swing analysis device) according to the second embodiment can provide information about a plurality of torque components that contribute to a rotational motion around the $t_2$-axis (i.e., a rotational motion in which the $q_2$-axis direction (i.e., the travel direction of the second link 12) is a tangent) around the joint 13 of the double pendulum model 1, the golfer can analyze the natural swing in detail using the information.

The invention is not limited to the above embodiments. Various modifications and variations may be made of the above embodiments without departing from the scope of the invention.

In the golf swing analysis system according to the above embodiments, the golf swing analysis device 30 and the inertial sensors 21 and 22 are connected via wireless connection (or cable connection) (see FIG. 4 or 10). Note that the golf swing analysis device 30 and the inertial sensors 21 and 22 may be provided with a memory card interface section, the inertial sensors 21 and 22 may write the triaxial acceleration data and the triaxial angular velocity data into a memory card, and the golf swing analysis device 30 may read the data from the memory card, and perform the swing analysis process.

Note that the above embodiments and the modifications thereof are merely examples, and the invention is not limited to the above embodiments and the modifications thereof. For example, one or more embodiments among the embodiments and/or one or more modifications among the above modifications may be appropriately combined.

The invention includes configurations that are substantially the same as the configurations described in connection with the above embodiments (e.g., in function, method and effect, or objective and effect). The invention also includes a configuration in which an unsubstantial element (part) described in connection with the above embodiments is replaced with another element (part). The invention also includes a configuration having the same effects as those of the configurations described in connection with the above embodiments, or a configuration capable of achieving the same object as those of the configurations described in connection with the above embodiments. The invention further includes a configuration obtained by adding a known technique to the configurations described in connection with the above embodiments.

Although only some embodiments of the invention have been described in detail above, those skilled in the art would readily appreciate that many modifications are possible in the embodiments without materially departing from the novel teachings and advantages of the invention. Accordingly, all such modifications are intended to be included within the scope of the invention.

What is claimed is:

1. A golf swing analysis device comprising:
a communicator configured to exchange signals with a first inertial sensor attached to a golf club; and
a processor configured to analyze a swing motion of the golf club performed by a golfer based on data from the first inertial sensor by the communicator, wherein the processor includes:
a joint force calculation section that generates a double pendulum model that includes a first link that corresponds to an upper part of a body of the golfer, a second link that corresponds to the golf club, and a joint that links the first link and the second link, and the joint force calculation section calculates a joint force applied to the joint along with the swing motion using an acceleration and an angular velocity measured by the first inertial sensor attached to the golf club;
a torque extraction section that extracts a torque and a torque component that causes the second link to make a rotational motion around a first axis from the joint force;
a torque change detection section that detects a timing at which a sign of the torque detected by the torque extraction section changes; and
an analytical information generation section that generates analytical information about a natural swing using the timing at which the sign of the torque changes detected by the torque change detection section or the torque component extracted by the torque extraction section, wherein the analytical information generation section determines a time at which a transition to the natural swing occurs using the timing detected by the torque change detection section.

2. The golf swing analysis device as defined in claim 1, wherein:
the first axis being an axis that is orthogonal to a longitudinal axis of the second link that corresponds to the golf club.

3. The golf swing analysis device as defined in claim 2, wherein:
the first axis being an axis that is orthogonal to the longitudinal axis of the second link that corresponds to the golf club and a travel direction of the second link.

4. The golf swing analysis device as defined in claim 1, wherein:
the communicator is configured to exchange signals with a second inertial sensor attached to the upper part of the body of the golfer; and
the processor is configured to have:
the joint force calculation section calculate at least one component among a plurality of components obtained by decomposing the joint force using at least one of an angular velocity measured by the first inertial sensor, an acceleration measured by the second inertial sensor, and an angular velocity measured by the second inertial sensor, and
the torque extraction section extract the torque component that causes the second link to make a rotational motion around the first axis from each of the plurality of components of the joint force calculated by the joint force calculation section.

5. The golf swing analysis device as defined in claim 1, wherein:
the communicator is configured to exchange signals with a second inertial sensor attached to the upper part of the body of the golfer; and
the processor is configured to have:
the joint force calculation section calculate a component of the joint force in a travel direction of the second link using the angular velocity measured by the first inertial sensor, and calculate a component of the joint force in a longitudinal axis direction of the first link using an angular velocity measured by the second inertial sensor, and
the torque extraction section extract the torque component that causes the second link to make a rotational motion around the first axis from each of the component in the travel direction of the second link and the component in the longitudinal axis direction of the first link calculated by the joint force calculation section.

6. The golf swing analysis device as defined in claim 1, wherein:
the first link corresponding to a virtual line that connects a center point of a line that connects shoulders of the golfer and a grip of the golf club.

7. The golf swing analysis device as defined in claim 1 further comprises:
a display that depicts information provided by the processor, wherein
the processor further includes an image data generation section that generates image data based on the torque extracted by the torque extraction section and the analytical information determined by the analytical information generation section, and
the information depicted by the display is based on the image data from the image data generation section.

8. The golf swing analysis device as defined in claim 7, wherein:
the torque extraction section determines time-series data of the torque;
the torque change detection section detects the time at which the sign of the torque changes from negative to positive before an impact time of the golf club based on the time-series data;
the analytical information generation section identifies the time at which the sign of the torque changes as the time of transition to the natural swing;
the image data generation section generates the image data that is indicative of a graph that plots the time-series data and identifies the impact time, a start time provided as a predetermined time period before the impact time, and the time of the natural swing; and
the display depicts the graph based on the image data from the image data generation section.

9. The golf swing analysis device as defined in claim 1 wherein:
the torque extraction section determines time-series data of the torque;
the torque change detection section detects the time at which the sign of the torque changes from negative to positive before an impact time of the golf club based on the time-series data; and
the analytical information generation section identifies the time at which the sign of the torque changes as the time of transition to the natural swing.

10. The golf swing analysis device as defined in claim 1 wherein the joint force calculation section calculates the joint force using:

$$F=m_2(\ddot{x}_{g2}-g)$$

$$\ddot{x}_{g2}-g=a_{S2}+\dot{\omega}_{S2}\times l_{S2}e_{l2}+\omega_{S2}\times(\omega_{S2}\times l_{S2}e_{l2})$$

wherein F is the joint force, $m_2$ is a mass of the second link, $\ddot{x}_{g2}$ is the acceleration of a center of gravity of the second link, g is gravitational acceleration, $a_{S2}$ is the acceleration measured by the first inertial sensor, $\omega_{S2}$ is the angular velocity of the joint measured by the first inertial sensor, $l_{s2}$ is a distance from an attachment position of the first inertial sensor to the center of gravity of the golf club, and $e_{l2}$ is a unit vector in a longitudinal axis direction of the second link.

11. A golf swing analysis device comprising:
a communicator configured to exchange signals with a first inertial sensor attached to a golf club and a second inertial sensor attached to an upper part of a body of a golfer; and
a processor configured to analyze a swing motion of the golf club performed by a golfer based on data received from the first inertial sensor and the second inertial sensor by way of the communicator, wherein the processor includes:
a joint force calculation section that generates a double pendulum model that includes a first link that corresponds to the upper part of the body of the golfer, a second link that corresponds to the golf club, and a joint that links the first link and the second link, and the joint force calculation section calculates at least one component among a plurality of components obtained by decomposing a joint force applied to the joint along with the swing motion using at least one of an angular velocity measured by the first inertial sensor attached to the golf club, an acceleration measured by the second inertial sensor attached to the upper part of the body of the golfer, and an angular velocity measured by the second inertial sensor;

a torque extraction section that extracts a torque and a torque component that causes the second link to make a rotational motion around a first axis from each component of the joint force calculated by the joint force calculation section;

a torque change detection section that detects a timing at which a sign of the torque detected by the torque extraction section changes; and an analytical information generation section that generates analytical information about a natural swing using the timing detected by the torque change detection section at which the sign of the torque changes, or the torque component extracted by the torque extraction section, wherein the analytical information generation section determines a time at which a transition to the natural swing occurs using the timing detected by the torque change detection section.

12. A golf swing analysis method comprising:

generating a double pendulum model that includes a first link that corresponds to an upper part of a body of a golfer, a second link that corresponds to a golf club, and a joint that links the first link and the second link;

calculating a joint force applied to the joint along with a swing motion using an acceleration and an angular velocity measured by a first inertial sensor attached to the golf club;

extracting a torque and a torque component that causes the second link to make a rotational motion around a first axis from the joint force;

detecting a timing at which a sign of the torque changes;

generating analytical information about a natural swing using the timing detected at which the sign of the torque changes or the torque component extracted; and determining a time at which a transition to the natural swing occurs using the timing at which the sign of the torque changes.

* * * * *

UNITED STATES PATENT AND TRADEMARK OFFICE
CERTIFICATE OF CORRECTION

PATENT NO.       : 9,604,101 B2                                Page 1 of 1
APPLICATION NO.  : 14/077490
DATED            : March 28, 2017
INVENTOR(S)      : Kazuhiro Shibuya et al.

It is certified that error appears in the above-identified patent and that said Letters Patent is hereby corrected as shown below:

In the Claims

In Claim 10, at Column 26, Line 36:

" $\ddot{x}_{g2} - g = \alpha_{S2} + \dot{\omega}_{S2} \times l_{S2}e_{l2} + \omega_{S2} \times (\omega_{S2} \times l_{S2}e_{l2})$ " should be -- $\ddot{x}_{g2} - g = \alpha_{S2} + \dot{\omega}_{S2} \times l_{S2}e_{l2} + \omega_{S2} \times (\omega_{S2} \times l_{S2}e_{l2})$ --.

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*